United States Patent
Bruneau et al.

(10) Patent No.: US 8,462,116 B2
(45) Date of Patent: *Jun. 11, 2013

(54) HAPTIC TRACKBALL DEVICE

(75) Inventors: Ryan D. Bruneau, Sunnyvale, CA (US); Ramon Alarcon, Santa Clara, CA (US); Louis B. Rosenberg, San Jose, CA (US); Erik J. Shahoian, San Leandro, CA (US)

(73) Assignee: Immersion Corporation, San Jose, CA (US)

(*) Notice: Subject to any disclaimer, the term of this patent is extended or adjusted under 35 U.S.C. 154(b) by 269 days.

This patent is subject to a terminal disclaimer.

(21) Appl. No.: 12/769,478

(22) Filed: Apr. 28, 2010

(65) Prior Publication Data

US 2010/0207882 A1     Aug. 19, 2010

Related U.S. Application Data

(63) Continuation of application No. 10/799,660, filed on Mar. 15, 2004, now Pat. No. 7,710,399, which is a continuation of application No. 09/507,539, filed on Feb. 18, 2000, now Pat. No. 6,707,443, which is a continuation-in-part of application No. 09/103,281, filed on Jun. 23, 1998, now Pat. No. 6,088,019, and a continuation-in-part of application No. 09/253,132, filed on Feb. 18, 1999, now Pat. No. 6,243,078, and a continuation-in-part of application No. 09/456,887, filed on Dec. 7, 1999, now Pat. No. 6,211,861.

(51) Int. Cl.
 *G06F 3/033* (2006.01)
 *G09G 5/00* (2006.01)

(52) U.S. Cl.
 USPC .............................. 345/167; 345/156; 715/703

(58) Field of Classification Search
 USPC .................................................. 345/156–167
 See application file for complete search history.

(56) References Cited

U.S. PATENT DOCUMENTS 2,972,140 A   2/1961   Hirsch
3,157,853 A   11/1964  Hirsch
(Continued)

FOREIGN PATENT DOCUMENTS

EP    0 265 011    4/1988
EP    0 349 086    1/1990
(Continued)

OTHER PUBLICATIONS

Adachi et al., "Sensory Evaluation of Virtual Haptic Push-Buttons," Technical Research Center, Suzuki Motor Corp., 1994.
(Continued)

*Primary Examiner* — Duc Dinh
(74) *Attorney, Agent, or Firm* — Kilpatrick Townsend & Stockton LLP

(57) ABSTRACT

In an aspect, an electronic device includes a housing; a manipulandum positioned in the housing, wherein the manipulandum is moveable in at least one rotary degree of freedom in response to a user moving the manipulandum; a sensor coupled to the manipulandum, the sensor outputs sensor signals associated with the movement of the manipulandum in the at least one rotary degree of freedom by the user's direct contact; a processor coupled to the sensor and configured to output one or more activating signals based on the sensor signals; a first actuator coupled to the manipulandum, wherein the first actuator outputs a contact force to the manipulandum upon receiving a first activating signal; and a second actuator positioned within the housing and separate from the first actuator, wherein the second actuator outputs an inertial force to the housing upon receiving a second activating signal.

17 Claims, 7 Drawing Sheets

U.S. PATENT DOCUMENTS

| | | |
|---|---|---|
| 3,220,121 A | 11/1965 | Cutler |
| 3,497,668 A | 2/1970 | Hirsch |
| 3,517,446 A | 6/1970 | Corlvon et al. |
| 3,623,064 A | 11/1971 | Kagan |
| 3,875,488 A | 4/1975 | Crocker et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 4,127,752 A | 11/1978 | Lowthorp |
| 4,160,508 A | 7/1979 | Salsbury |
| 4,236,325 A | 12/1980 | Hall et al. |
| 4,262,549 A | 4/1981 | Schwellenbach |
| 4,333,070 A | 6/1982 | Barnes |
| 4,414,984 A | 11/1983 | Zarudiansky |
| 4,436,188 A | 3/1984 | Jones |
| 4,464,117 A | 8/1984 | Foerst |
| 4,477,043 A | 10/1984 | Repperger |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,604,016 A | 8/1986 | Joyce |
| 4,708,656 A | 11/1987 | De Vries et al. |
| 4,713,007 A | 12/1987 | Alban |
| 4,731,603 A | 3/1988 | McRae et al. |
| 4,782,327 A | 11/1988 | Kley et al. |
| 4,787,051 A | 11/1988 | Olson |
| 4,794,384 A | 12/1988 | Jackson |
| 4,794,392 A | 12/1988 | Selinko |
| 4,795,296 A | 1/1989 | Jau |
| 4,800,721 A | 1/1989 | Cemenska et al. |
| 4,839,838 A | 6/1989 | LaBiche et al. |
| 4,861,269 A | 8/1989 | Meenen, Jr. |
| 4,868,549 A | 9/1989 | Affinito et al. |
| 4,885,565 A | 12/1989 | Embach |
| 4,891,764 A | 1/1990 | McIntosh |
| 4,896,554 A | 1/1990 | Culver |
| 4,906,843 A | 3/1990 | Jones et al. |
| 4,930,770 A | 6/1990 | Baker |
| 4,934,694 A | 6/1990 | McIntosh |
| 4,935,728 A | 6/1990 | Kley |
| 4,949,119 A | 8/1990 | Moncrief et al. |
| 4,961,038 A | 10/1990 | MacMinn |
| 4,983,901 A | 1/1991 | Lehmer |
| 5,004,391 A | 4/1991 | Burdea |
| 5,019,761 A | 5/1991 | Kraft |
| 5,022,384 A | 6/1991 | Freels et al. |
| 5,022,407 A | 6/1991 | Horch et al. |
| 5,035,242 A | 7/1991 | Franklin et al. |
| 5,038,089 A | 8/1991 | Szakaly |
| 5,044,956 A | 9/1991 | Behensky |
| 5,065,145 A | 11/1991 | Purcell |
| 5,076,517 A | 12/1991 | Ferranti et al. |
| 5,078,152 A | 1/1992 | Bond |
| 5,086,296 A | 2/1992 | Clark |
| 5,095,303 A | 3/1992 | Clark et al. |
| 5,103,404 A | 4/1992 | Mcintosh |
| 5,107,080 A | 4/1992 | Rosen |
| 5,107,262 A | 4/1992 | Cadoz et al. |
| 5,116,180 A | 5/1992 | Fung et al. |
| 5,138,154 A | 8/1992 | Hotelling |
| 5,139,261 A | 8/1992 | Openiano |
| 5,146,566 A | 9/1992 | Hollis, Jr. et al. |
| 5,165,897 A | 11/1992 | Johnson |
| 5,175,459 A | 12/1992 | Danial et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,189,355 A | 2/1993 | Larkins et al. |
| 5,193,963 A | 3/1993 | McAffee et al. |
| 5,197,003 A | 3/1993 | Moncrief et al. |
| 5,203,563 A | 4/1993 | Loper, III |
| 5,212,473 A | 5/1993 | Louis |
| 5,220,260 A | 6/1993 | Schuler |
| 5,223,776 A | 6/1993 | Radke et al. |
| 5,235,868 A | 8/1993 | Culver |
| 5,240,417 A | 8/1993 | Smithson et al. |
| 5,264,768 A | 11/1993 | Gregory et al. |
| 5,271,290 A | 12/1993 | Fischer |
| 5,275,174 A | 1/1994 | Cook |
| 5,275,565 A | 1/1994 | Moncrief |
| 5,280,276 A | 1/1994 | Kwok |
| 5,283,970 A | 2/1994 | Aigner |
| 5,286,203 A | 2/1994 | Fuller et al. |
| 5,296,871 A | 3/1994 | Paley |
| 5,299,810 A | 4/1994 | Pierce |
| 5,309,140 A | 5/1994 | Everett |
| 5,313,230 A | 5/1994 | Venolia et al. |
| 5,317,336 A | 5/1994 | Hall |
| 5,334,027 A | 8/1994 | Wherlock |
| 5,354,162 A | 10/1994 | Burdea et al. |
| 5,355,148 A | 10/1994 | Anderson |
| 5,374,942 A | 12/1994 | Gilligan et al. |
| 5,381,080 A | 1/1995 | Schnell et al. |
| 5,388,992 A | 2/1995 | Franklin et al. |
| 5,389,865 A | 2/1995 | Jacobus et al. |
| 5,396,266 A | 3/1995 | Brimhall |
| 5,398,044 A | 3/1995 | Hill |
| 5,399,091 A | 3/1995 | Mitsumoto |
| 5,405,152 A | 4/1995 | Katanics et al. |
| 5,414,337 A | 5/1995 | Schuler |
| 5,436,622 A | 7/1995 | Gutman et al. |
| 5,437,607 A | 8/1995 | Taylor |
| 5,451,924 A | 9/1995 | Massimino et al. |
| 5,457,479 A | 10/1995 | Cheng |
| 5,459,382 A | 10/1995 | Jacobus et al. |
| 5,466,213 A | 11/1995 | Hogan |
| 5,471,571 A | 11/1995 | Smith et al. |
| 5,473,235 A | 12/1995 | Lance et al. |
| 5,473,344 A | 12/1995 | Bacon et al. |
| 5,477,237 A | 12/1995 | Parks |
| 5,491,477 A | 2/1996 | Clark et al. |
| 5,506,605 A | 4/1996 | Paley |
| 5,512,919 A | 4/1996 | Araki |
| 5,513,100 A | 4/1996 | Parker et al. |
| 5,530,455 A | 6/1996 | Gillick et al. |
| 5,542,672 A | 8/1996 | Meredith |
| 5,543,821 A | 8/1996 | Marchis et al. |
| 5,547,382 A | 8/1996 | Yamasaki |
| 5,550,562 A | 8/1996 | Aoki et al. |
| 5,555,894 A | 9/1996 | Doyama et al. |
| 5,565,840 A | 10/1996 | Thorner et al. |
| 5,565,887 A | 10/1996 | McCambridge et al. |
| 5,575,761 A | 11/1996 | Hailanpour |
| 5,576,727 A | 11/1996 | Rosenberg et al. |
| 5,583,407 A | 12/1996 | Yamaguchi |
| 5,583,478 A | 12/1996 | Renzi |
| 5,589,828 A | 12/1996 | Armstrong |
| 5,589,854 A | 12/1996 | Tsai |
| 5,596,347 A | 1/1997 | Robertson et al. |
| 5,625,576 A | 4/1997 | Massie et al. |
| 5,629,594 A | 5/1997 | Jacobus et al. |
| 5,642,469 A | 6/1997 | Hannaford et al. |
| 5,643,087 A | 7/1997 | Marcus et al. |
| 5,656,901 A | 8/1997 | Kurita |
| 5,666,138 A | 9/1997 | Culver |
| 5,666,473 A | 9/1997 | Wallace |
| 5,669,818 A | 9/1997 | Thorner et al. |
| 5,684,722 A | 11/1997 | Thorner et al. |
| 5,690,582 A | 11/1997 | Ulrich et al. |
| 5,691,747 A | 11/1997 | Amano |
| 5,691,898 A | 11/1997 | Rosenberg et al. |
| 5,694,013 A | 12/1997 | Stewart et al. |
| 5,696,537 A | 12/1997 | Soljell |
| 5,709,219 A | 1/1998 | Chen et al. |
| 5,712,725 A | 1/1998 | Faltermeier et al. |
| 5,714,978 A | 2/1998 | Yamanaka et al. |
| 5,721,566 A | 2/1998 | Rosenberg et al. |
| 5,724,106 A | 3/1998 | Autry et al. |
| 5,724,278 A | 3/1998 | Ohgose et al. |
| 5,731,804 A | 3/1998 | Rosenberg |
| 5,734,373 A | 3/1998 | Rosenberg et al. |
| 5,736,978 A | 4/1998 | Hasser et al. |
| 5,739,811 A | 4/1998 | Rosenberg et al. |
| 5,742,278 A | 4/1998 | Chen et al. |

| | | | |
|---|---|---|---|
| 5,745,715 A | 4/1998 | Pickover et al. | |
| 5,754,023 A | 5/1998 | Roston et al. | |
| 5,755,577 A | 5/1998 | Gillio | |
| 5,757,358 A | 5/1998 | Osga | |
| 5,760,764 A | 6/1998 | Martinelli | |
| 5,766,016 A | 6/1998 | Sinclair | |
| 5,767,839 A | 6/1998 | Rosenberg | |
| 5,771,037 A | 6/1998 | Jackson | |
| 5,781,172 A * | 7/1998 | Engel et al. | 345/164 |
| 5,784,052 A * | 7/1998 | Keyson | 345/167 |
| 5,785,630 A | 7/1998 | Bobick et al. | |
| 5,790,108 A * | 8/1998 | Salcudean et al. | 345/184 |
| 5,802,353 A | 9/1998 | Avila et al. | |
| 5,805,140 A | 9/1998 | Rosenberg | |
| 5,805,165 A | 9/1998 | Thorne, III et al. | |
| 5,808,601 A | 9/1998 | Leah et al. | |
| 5,808,603 A | 9/1998 | Chen | |
| 5,821,921 A | 10/1998 | Osborn et al. | |
| 5,823,876 A | 10/1998 | Unbehand | |
| 5,825,308 A | 10/1998 | Rosenberg | |
| 5,831,408 A | 11/1998 | Jacobus et al. | |
| 5,844,392 A | 12/1998 | Peurach et al. | |
| 5,857,986 A | 1/1999 | Moriyasu | |
| 5,877,748 A | 3/1999 | Redlich | |
| 5,880,714 A | 3/1999 | Rosenberg et al. | |
| 5,889,670 A | 3/1999 | Schuler et al. | |
| 5,889,672 A | 3/1999 | Schuler et al. | |
| 5,897,437 A | 4/1999 | Nishiumi et al. | |
| 5,912,661 A | 6/1999 | Siddiqui | |
| 5,914,705 A | 6/1999 | Johnson et al. | |
| 5,944,151 A | 8/1999 | Jakobs et al. | |
| 5,945,772 A | 8/1999 | Macnak et al. | |
| 5,956,016 A | 9/1999 | Kuenzner et al. | |
| 5,956,484 A | 9/1999 | Rosenberg et al. | |
| 5,959,613 A | 9/1999 | Rosenberg et al. | |
| 5,973,670 A | 10/1999 | Barber et al. | |
| 5,973,689 A | 10/1999 | Gallery | |
| 5,984,880 A | 11/1999 | Lander et al. | |
| 5,986,643 A | 11/1999 | Harvill et al. | |
| 5,990,869 A | 11/1999 | Kubica et al. | |
| 6,001,014 A | 12/1999 | Ogata et al. | |
| 6,004,134 A | 12/1999 | Marcus et al. | |
| 6,005,551 A | 12/1999 | Osborne et al. | |
| 6,020,876 A | 2/2000 | Rosenberg et al. | |
| 6,028,593 A | 2/2000 | Rosenberg et al. | |
| 6,046,726 A | 4/2000 | Keyson | |
| 6,061,004 A | 5/2000 | Rosenberg | |
| 6,078,308 A | 6/2000 | Rosenberg et al. | |
| 6,088,017 A | 7/2000 | Tremblay et al. | |
| 6,088,019 A | 7/2000 | Rosenberg | |
| 6,088,020 A | 7/2000 | Mor | |
| 6,100,874 A | 8/2000 | Schena et al. | |
| 6,111,577 A | 8/2000 | Zilles et al. | |
| 6,128,006 A | 10/2000 | Rosenberg et al. | |
| 6,160,489 A | 12/2000 | Perry et al. | |
| 6,184,868 B1 | 2/2001 | Shahoian et al. | |
| 6,211,861 B1 | 4/2001 | Rosenberg et al. | |
| 6,219,034 B1 | 4/2001 | Elbing et al. | |
| 6,252,579 B1 | 6/2001 | Rosenberg et al. | |
| RE37,374 E | 9/2001 | Roston et al. | |
| 6,437,771 B1 | 8/2002 | Rosenberg et al. | |
| 6,448,977 B1 | 9/2002 | Braun et al. | |
| 6,452,586 B1 * | 9/2002 | Holmdahl et al. | 345/163 |
| 6,480,185 B1 | 11/2002 | Kiljander et al. | |
| 6,641,480 B2 | 11/2003 | Murzanski et al. | |
| 6,697,043 B1 | 2/2004 | Shahoian et al. | |
| 6,707,443 B2 | 3/2004 | Bruneau et al. | |
| 6,876,891 B1 | 4/2005 | Schuler et al. | |
| 7,024,625 B2 | 4/2006 | Shalit | |

FOREIGN PATENT DOCUMENTS

| | | |
|---|---|---|
| EP | 0 607 580 | 7/1994 |
| EP | 0 626 634 | 11/1994 |
| JP | 01-003664 | 7/1990 |
| JP | 02-109714 | 1/1992 |
| JP | 04-007371 | 8/1993 |
| JP | 05-193862 | 1/1995 |
| JP | 7-013693 | 1/1995 |
| JP | 7-182104 | 7/1995 |
| WO | WO 92/00559 | 1/1992 |
| WO | WO 95/12188 | 5/1995 |
| WO | WO 95/20788 | 8/1995 |
| WO | WO 95/32459 | 11/1995 |
| WO | WO 96/28777 | 9/1996 |
| WO | WO 97/12357 | 4/1997 |
| WO | WO 97/21160 | 6/1997 |
| WO | WO 97/31333 | 8/1997 |
| WO | WO 98/08159 | 2/1998 |
| WO | WO 98/24183 | 6/1998 |
| WO | WO 98/58323 | 12/1998 |
| WO | WO 00/03313 | 1/2000 |
| WO | WO 00/21071 | 4/2000 |

OTHER PUBLICATIONS

Atkinson et al, "Computing with Feeling," Comput. & Graphics, vol. 2, 1977, pp. 97-103.

Batter et al., "Grope-I: A Computer Display to the Sense of Feel," Proc. IFIP Congress. 1971, pp. 759-763.

Bliss, "Optical-to-Tactile Image Conversion for the Blind," *IEEE Transactions on Man-Machine Systems*, vol. MMS-11 , No. 1, Mar. 1970.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Brooks, Jr.et al., "Project GROPE, Haptic Displays for Scientific Visualization," Computer Graphics, vol. 24, 114, 1990, pp. 177-184.

Bunolo et al, "Pen-Based Force Display for Precision Manipulation in Virtual Environments," 0-8186-7084 IEEE Mar. 1995, pp. 217-224.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Calder,"Design of A Force-Feedback Touch-Introducing Actuator for Teleoperator Robot Control." *Bachelor of Science Thesis*, MIT, May 1983, archived Jun. 23, 1983.

Caldwell et al., "Enhanced Tactile Feedback (Tele-Taction) Using a Multi-Functional Sensory System," 1050-4729/93, pp. 955-960, 1993.

Colgate et al., "Implementation of Stiff Virtual Walls in Force-Reflecting Interfaces," Northwestern University, IL, 1993, pp. 1-8.

"Component Maintenance Manual With Illustrated Parts List, Coaxial Control Shaker Part No. C-25502," Safe Flight Instrument Corporation, Revised Jan. 28, 2002 (3 pages).

"Cyberman Technical Specification," *Logifech Cyberman SWIFT Supplement to Logitech Mouse Technical Reference and Programming Guide*, 41511994.

Dennerlein, et al., "Vibrotactile Feedback for Industrial Telemanipulators," ASME IMECE, 6th Annual Symp. On Haptic Interfaces for Virtual Environment and Teleoperator Systems, Nov. 1997, pp. 1-7.

Eberhardt et al., "Including Dynamic Haptic Perception by The Hand: System Description and Some Results," DSC—vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Ellis et al, "Design and Evaluation of a High-Performance Prototype Planar Haptic Interface," DSC. vol. 49, Advances in Robotics, Mechatronics, and Haptic Interfaces ASME Dec. 1993, pp. 55-65.

Gobel et al., "Tactile Feedback Applied to Computer Mice," International Journal of Human-Computer Interaction, vol. 7, No. 1, pp. 1-24, 1995.

Gotow et al, "Perception of Mechanical Properties at the Man-Machine Interface," IEEE CH 2503-1, 1987, pp. 688-690.

Gotow et al.,"Controlled Impedance Test Apparatus for Studying Human Interpretation of Kinesthetic Feedback," WA11-11:00, pp. 332-337.

Hannaford et al., "Force-Feedback Cursor Control," NASA Tech Brief, vol. 13, No. 11, Item 1121, Jet Propulsion Lab., Nov. 1989.

Hannaford et al., "Performance Evaluation of a 6-Axis Generalized Force-Reflecting Teleoperator," IEEE Transaction on Systems, Man, and Cybernetics, vol. 21, No. 3, 1991, p. 621-623, 631-633.

Hasser, C. et al., "Tactile Feedback with Adaptive Controller for a Force-Reflecting Haptic Display," Parts 1&2, IEEE 0-7803-3131-1, 1996, pp. 526-533.

Hirota et al., "Development of Surface Display," IEEE 0-7803-1363-1, 1993, pp. 256-262.

Howe el al.,"Task Performance w/ a Dextrous Teleoperated Hand System," Proc. of SPIE, vol. 1833, 1992, pp. I-9.

Howe. "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin. "Mouse Ball-Actuating Device With Force and Tactile Feedback," vol. 32, No. 98, Feb. 1990.

Iwata, H., "Artificial Reality with Force-Feedback: Development of Desktop Virtual Space with Compact Master Manipulator" Computer Graphics vol. 24 No. 4 Au t. 1990, pp. 165•170.

Iwata, "Pen-based Haptic Virtual Environment," 0-7803-1363-1/93 IEEE, pp. 287-292, 1993.

Jacobsen et at., "High Performance, Dextrous Telerobotic Manipulator With Force Reflection," Intervention/ROV'91 Conference & Exposition, Hollywood, Florida. May 21-23, 1991.

Johnson, "Shape-Memory Alloy Tactile Feedback Actuator," *Armstrong Aerospace Medical Research Laboratory*, AAMRL-TR-90-039, Aug. 1990.

Jones et al., "A Perceptual Analysis of Stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kelley et al, "On the Development of a Force-Feedback Mouse and Its Integration Into a Graphical User Interface," Symp. On Haptic Interfaces for Virtual Envir. And Teleoperator Systems, 1994 Int'l Mech. Eng. Congress and Exhibition, Nov. 1994.

Kelley, A. J. et al., "MagicMouse: Tactile and Kinesthetic Feedback in the Human-Computer Interface using an Electromagnetically Actuated Input/Output Device," Dept. of Elec. Eng., Univ. of Brit. Columbia, 1993, pp. 1-27.

Kilpatrick et al., "The Use of Kinesthetic Supplement in and Interactive System," University of North Carolina, 1976, pp. 1-172.

Kontarinis et al., "Tactile Display of Vibratory Information in Teleoperation and Virtual Environments," Presence, 4(4):387-402, Harvard Univ., 1995.

Kontarinis et al., "Display of High Frequency TactileInformation to Teleoperators," Telemanipulator Technology and Space Telerobotics, Kim Ed. Proc. SPIE vol. 2057, pp. 40-50, Sep. 7-9, 1993.

Lake, "Cyberman from Logitech," at http://www.ibiblio.org/GameBytesIissue21/greviewslcybenman.html, 1994.

Marcus, "Touch Feedback in Surgery." Proceedings of Virtual Reality and Medicine the Cutting Edge, Sep. 8-11, 1994.

McAffee, "Teleoperator Subsystem/Telerobot Demonsdtrator: Force Reflecting Hand Controller Equipment Manual," JPL D-5172, pp. 1 50, A1-A36, 81-B5, C1-C36, Jan. 1988.

Millman et al., "Design of a 4 Degree of Freedom Force-Reflecting Manipulandum with a Specified Force/Torque Workspace " IEEE CH. 2969-4, 1991, pp. 1488-1493.

Minsky, Margaret et al., "Feeling and Seeing: Issues in Force Display," ACM 089791-351-5, 1990, pp. 235-242.

Minsky. "Computational Haptics:The Sandpaper System for Synthesizing Texture for a Force-Feedback Display," Ph.D. Dissertation. MIT, Jun. 1995.

Munch et al., "Intelligent Control of Haptic Displays," Eurographics '96, vol. 15, No. 3, 1996, pp. 217-226.

Noll, "Man-Machine Tactile," *SID Journal*, Jul./Aug. 1972 Issue.

Ouh-Young et al., "Creating an Illusion of Feel: Control Issues for Force Display," Univ. of N. Carolina, 1989, pp. 1-14.

Ouh-Young et al., "The Development of a Low-Cost Force Feedback Joystick and Its Use in the Virtual Reality Environment," Proceedings of the Third Pacific Conference on Computer Graphics and Applications. Pacific Graphics '95, Seoul, Korea, Aug. 21-24, 1995.

Ouh-Young, "A Low-Cost Force Feedback Joystick and Its Use in PC Video Games," IEEE Transactions on Consumer Electronics, vol. 41, No. 3, Aug. 1995.

Ouh-Young,"Force Display in Molecular Docking," Order No. 9034744, p. 1-369, 1990.

Patrick et al., "Design and Testing of a Non-reactive. Fingertip, Tactile Display for Interaction with Remote Environments," Cooperative Intelligent Robotics in Space,Rui J. deFigueiredo et al., Editor, Proc. SPIE vol. 1387, pp. 215-222, 1990.

Payette, J. et la., "Evaluation of a Force Feedback (Haptic) Computer Pointing Device in Zero Gravity," DSC—vol. 58, Proc. of ASME Dynamics Systems and Control Divisions, ASME 1996, pp. 547-553.

Pimentel et al., 'Virtual Reality: through the new looking glass, 2'• Edition; McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Ramstein et al., "The Pantograph: A Large Workspace Haptic Device for a Multimodal Human Computer Interaction," Computer-Human Interaction. CHI '94.

Ramstein, C., "Combining Haptic and Braille Technologies: Design Issues and Pilot Study," ASSETS '96, 2nd Annual ACM Conf. on Assistive Technologies, 1996, pp. 37-44.

Rosenberg et al., "Commercially Viable Force Feedback Controller for Individuals with Neuromotor Disabilities," USAF Armstrong Lab., May 1996.

Rosenberg et al., "Perceptual Decomposition of Virtual Haptic Surfaces," Proc. IEEE Symposium on Research Frontiers in Virtual Reality, 1993, pp. 1-8.

Rosenberg et al., "The Use of Force Feedback to Enhance Graphical User Interfaces," Stereoscopic Displays & Virtual Reality Systems III (1996). Proc. SPIE 2653,pp. 243-248.

Rosenberg, "Perceptual Design of a Virtual Rigid Surface Contact," Armstrong Laboratory AUCF-TR-1995. {)029, 1993, pp. 1-45.

Rosenberg, "Virtual Fixtures: Perceptual Overlays Enhance Operator Performance in Telepresence Tasks," *Ph.D. Dissertation*, Stanford University, Jun. 1994.

Rosenberg, L., "Virtual Fixtures as Tools to Enhance Operator Performance in Telepresence Environments," SPIE Manipulator Technology, 1993, pp. 1-12.

Rosenberg, L., "A Force Feedback Programming Primer—For PC Gaming Peripherals Supporting I-Force 2.0 and Direct—X 5.0" Immersion Corporation, 1997, pp. 1-176.

Russo, "The Design and Implementation of a Three Degree of Freedom Force Output Joystick," MIT libraries Archives Aug. 14, 1990, pp. 1-131, May 1990.

Russo,"Controlling Dissipative Magnetic Particle Brakes•in Force Reflective Devices," DSC—vol. 42, Advances in Robotics, pp. 63-70, ASME 1992.

Scannell. 'Taking a Joystick Ride,' Computer Currents. Boston Edition. vol. 9, No. 11. Nov. 1994.

Schmult et al., "Application Areas for a Force-Feedback Joystick," DSC—vol. 49, Advances in Robotics, Mecbatronics, and Haptic Interfaces ASME 1993 ,pp. 47-54.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al.,"Model-X Force-Reflecting-Hand-Controller," NT Control No. MP0-17851; JPL Case No. 5348, pp. 1-4, Jun. 15, 1989.

Stanley et al., "Computer Simulation of Interacting Dynamic Mechanical Systems Using Distributed Memory Parallel Processors," DSC—vol. 42, Advances in Robotics, pp. 55-61.ASME 1992.

Su et al., "The Virtual Panel Architecture: A 30 Gesture Framework," Computer Science Depts., Univ. of Maryland, Texas A&M Univ. Jan. 1993.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Technical Manual Overhaul Instructions With Parts Breakdown, Coaxial Control Shaker Part No. C-25502, Safe Flight Instrument Corporation, Revised Jul. 15, 1980 {23 pages}.

Terry et al., "Tactile Feedback in a Computer Mouse," Proceedings of Fourteenth Annual Northeast Bioengineering Conference. University of New Hampshire, Mar. 10-11, 1988.

Wiker, "Teletouch Display Development: Phase 1 Report," *Technical Report 1230*, Naval Ocean Systems Center, San Diego, Jul. 1988.

Wiker, S. et al., "Development of Tactile Mice for Blind Access to Computers: Importance of Stimulation locus, Object Size and Vibrotactile Display Resolution," Proc. of Human Factors Society 35 Annual Meeting 1991, pp. 708-712.

Winey III, "Computer Simulated Visual & Tactile Feedback as an Aid to Manipulator & Vehicle Control," MIT, 1981, pp. 1-79.

Yamakita et al., "Tele-Virtual Reality of Dynamic MechanicalModel," Proceedings of the 1992 IEEE/RSJ International Conference on Intelligent Robots and Systems, Raleigh,NC, Jul. 7-10, 1992.

Yokokoji et al., "What you see is what you can feel," IEE-0-8186-7295-1, 1996, pp. 46-54.

\* cited by examiner ic feedback device, and more particularly to computer interface devices that allow the
HAPTIC TRACKBALL DEVICE

CROSS-REFERENCE TO RELATED APPLICATIONS

This application is a continuation of co-pending application U.S. application Ser. No. 10/799,660, filed Mar. 15, 2004 which is a continuation of patent application Ser. No. 09/507, 539 filed on Feb. 18, 2000, now U.S. Pat. No. 6,707,443, which is a continuation-in-part of co-pending parent patent applications:

Application Ser. No. 09/103,281, filed Jun. 23, 1998 on behalf of Louis Rosenberg, entitled, "Low Cost Force Feedback Device with Actuator for Non-Primary Axis,"

Application Ser. No. 09/253,132, filed Feb. 18, 1999 on behalf of Louis Rosenberg, entitled, "Low Cost Force Feedback Pointing Device," and Application Ser. No. 09/456,887, filed Dec. 7, 1999 on behalf of Louis Rosenberg, entitled, "Tactile Mouse Device," all assigned to the assignee of this present application.

BACKGROUND

The present invention relates generally to interface devices for allowing humans to interface with computer systems, and more particularly to computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), etc. Common human-computer interface devices used for such interaction include a mouse, joystick, trackball, steering wheel, stylus, tablet, pressure-sensitive sphere, or the like, that is connected to the computer system controlling the displayed environment. Typically, the computer updates the environment in response to the users manipulation of a physical manipulandum such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor or other graphical object in a graphical environment, where the location of the cursor is responsive to the motion of the user object.

In some interface devices, force feedback or tactile feedback is also provided to the user, more generally known herein as "haptic feedback." These types of interface devices can provide physical sensations which are felt by the user manipulating a user manipulandum of the interface device. One or more motors or other actuators are coupled to the joystick or mouse and are connected to the controlling computer system. The computer system controls forces on the joystick or mouse in conjunction and coordinated with displayed events and interactions by sending control signals or commands to the actuators. The computer system can thus convey physical force sensations to the user in conjunction with other supplied feedback as the user is grasping or contacting the interface device or manipulatable object of the interface device. For example, when the user moves the manipulatable object and causes a displayed cursor to interact with a different displayed graphical object, the computer can issue a command that causes the actuator to output a force on the physical object, conveying a feel sensation to the user.

One problem with current force feedback controllers in the home consumer market is the high manufacturing cost of such devices, which makes the devices expensive for the consumer. A large part of this manufacturing expense is due to the inclusion of multiple actuators and corresponding control electronics in the force feedback device. In addition, high quality mechanical and force transmission components such as linkages and bearings must be provided to accurately transmit forces from the actuators to the user manipulandum and to allow accurate sensing of the motion of the user object. These components are complex and require greater precision in their manufacture than many of the other components in an interface device, and thus further add to the cost of the device. A need therefore exists for a haptic device that is lower in cost to manufacture yet offers the user haptic feedback to enhance the interaction with computer applications.

OVERVIEW

In an as low-cost haptic feedback device having a actuator for low cost force feedback for enhancing interactions and manipulations in a displayed graphical environment.

In an aspect, an electronic device includes a housing. The device includes a manipulandum positioned in the housing, wherein the manipulandum is moveable in at least one rotary degree of freedom in response to a user moving the manipulandum. The device includes a sensor coupled to the manipulandum, in that the sensor outputs sensor signals associated with the movement of the manipulandum in the at least one rotary degree of freedom by the user's direct contact. The device includes a processor coupled to the sensor and configured to output one or more activating signals based on the sensor signals. A first actuator is coupled to the manipulandum, wherein the first actuator outputs a contact force to the manipulandum upon receiving a first activating signal. A second actuator is positioned within the housing and is separate from the first actuator, wherein the second actuator outputs an inertial force to the housing upon receiving a second activating signal.

In an aspect, an electronic device comprises a housing having a display. The device includes a sphere that is positioned in the housing and moveable in at least one rotary degree of freedom in response to a user moving the sphere in the at least one rotary degree of freedom by direct contact. The device includes a processor which runs a software program configured to present the user with a graphical user interface on the display navigatable by the user. The device includes a sensor coupled to the sphere, the sensor outputting, to the processor, sensor signals associated with the movement of the sphere. The device includes a first actuator coupled to the manipulandum, wherein the first actuator outputs a contact force to the sphere in a direction normal to a surface of the sphere upon receiving a first activating signal from the processor, wherein the processor outputs the first activating signal upon the user navigating within a predetermined area of the graphical user interface.

In an aspect, an electronic device, comprises a housing which has a button. The device includes a sphere positioned in the housing, wherein the sphere is moveable in at least one rotary degree of freedom in response to a user moving the sphere by direct contact. The device includes a first sensor coupled to the sphere, in that the first sensor outputs first sensor signals associated with the movement of the sphere in the at least one rotary degree of freedom. The device includes a second sensor coupled to the button, in that the second sensor outputs second sensor signals associated with the user depressing the button. The device includes a processor coupled to the sensor and configured to output one or more activating signals based on the either or both of the first and second sensor signals. The device includes a first actuator coupled to the sphere. wherein the first actuator outputs a first contact force to the sphere upon receiving a first activating signal from the processor. The device includes a second actuator positioned within the housing and separate from the first actuator, wherein the second actuator outputs a second contact force to the button upon receiving a second activating signal from the processor.

In any or all of the above aspects, the manipulandum, where recited, may be a sphere, joystick and the like. The contact, first and/or second forces may be a pulse, vibration, and the like. The inertial forces may be a pulse, vibration and the like.

These and other advantages will become apparent to those skilled in the art upon a reading of the following specification and a study of the several figures of the drawing.

DETAILED DESCRIPTION

Figure 1:
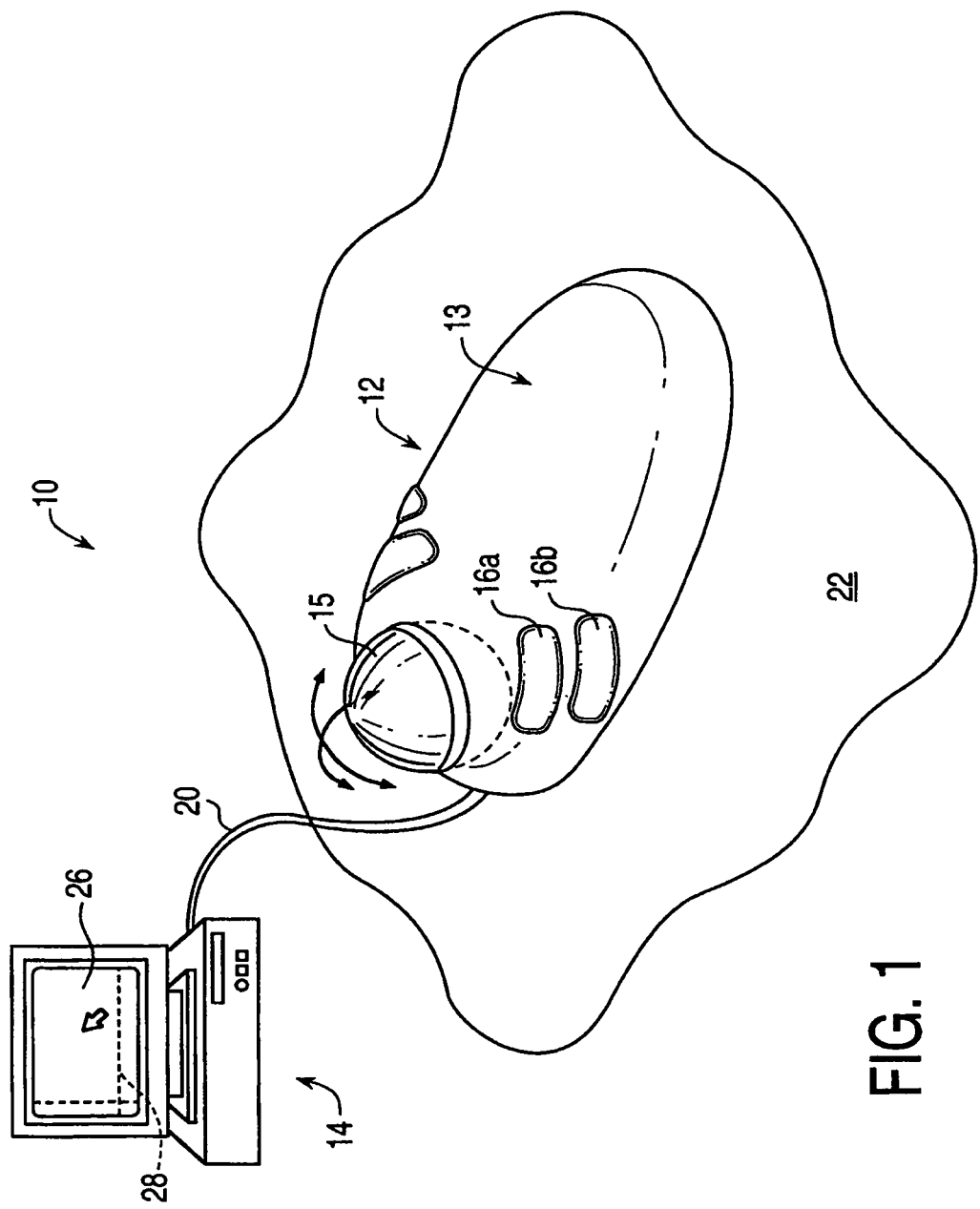
FIG. 1 is a perspective view of system including a haptic trackball device of the present invention connected to a host computer.

FIG. 1 is a perspective view of a haptic feedback interface system 10 of the present invention capable of providing input to a host computer based on the user's manipulation of a trackball and capable of providing haptic feedback to the user of the interface system based on events occurring in a program implemented by the host computer. System 10 includes a trackball device 12 and a host computer 14. It should be noted that the term "trackball" as used herein, indicates any device in which a spherical object can be rotated by the user to provide input to the host computer.

Trackball device 12 includes a housing 13 and a sphere or ball 15. Sphere 15 is contacted by a user's finger and/or palm and is rotated in any direction, e.g. in two degrees of freedom. In the embodiment shown, the user preferably rests his or her palm on the housing 13 when moving the sphere 15 to provide a hand rest. In other embodiments, the trackball device can provide a large sphere 15 and a small housing 13 with buttons, or can provide a sphere that can be contacted in multiple areas, such as with a thumb and a forefinger on both sides of the sphere.

The sphere 15 can be rotated in the two degrees of freedom to provide input to the host computer 14. For example, a user can move sphere 15 to provide two-dimensional input to a computer system to correspondingly move a computer generated graphical object, such as a cursor or other image, in a graphical environment provided by computer 14 or to control a virtual character, vehicle, or other entity in a game or simulation. In addition, trackball device 12 preferably includes one or more buttons 16a and 16b to allow the user to provide additional commands to the computer system, and may also include additional buttons.

Trackball device 12 preferably includes an actuator 18 which is operative to produce forces on the trackball device 12. This operation is described in greater detail below with reference to FIG. 2.

Trackball device 12 rests on a ground surface 22 such as a tabletop or other reference surface. A user contacts the sphere 15 and housing 13 while using the device 12. Since the sphere 15 can move in both directions without moving the housing 13, the housing typically remains stationary with respect to the surface 22. Sensor mechanisms used to detect and measure sphere 15 rotation are described below with reference to FIG. 2.

Trackball device 12 is preferably a relative device, in which the device 12 reports a change in position to the host computer and the host controls a graphical object, adjusts a value, etc., based on the change in position. Thus, the sphere 15 can be rotated indefinitely in any direction. In other embodiments, the trackball device 12 may be implemented as an absolute device, in which the sphere 15 has an absolute position in a workspace and the absolute position is reported to the host computer. In one absolute embodiment, stops can be placed in the workspace of the sphere 15 to prevent the sphere from moving outside the bounded workspace.

Trackball device 12 is coupled to the computer 14 by a bus 20, which communicates signals between device 12 and computer 14 and may also, in some preferred embodiments, provide power to the trackball device 12. Components such as an actuator (described below) require power that can be supplied from through the bus 20 if the bus is, for example, a USB or Firewire bus. In other embodiments, signals can be sent between trackball device 12 and computer 14 by wireless transmission/reception. In some embodiments, the power for the actuator can be supplemented or solely supplied by a power storage device provided on the device 12, such as a capacitor or one or more batteries. Some embodiments of such are disclosed in U.S. Pat. No. 5,691,898, incorporated herein by reference.

Host computer 14 is preferably a personal computer or workstation, such as a PC compatible computer or Macintosh personal computer, or a Sun or Silicon Graphics workstation. For example, the computer 14 can operate under the Windows™, MacOS™, Unix™, or MS-DOS operating system. Alternatively, host computer system 14 can be one of a variety of home video game console systems commonly connected to a television set or other display, such as systems available from Nintendo™, Sega™, or Sony™. In other embodiments, host computer system 14 can be a "set top box" which can be used, for example, to provide interactive television functions to users, a "network-" or "internet-computer" which allows users to interact with a local or global network using standard connections and protocols such as used for the Internet and World Wide Web, or other appliance or device allowing the user to provide two-dimensional (or greater) input for selection or control. Host computer preferably includes a host microprocessor, random access memory (RAM), read only memory (ROM), input/output (I/O) circuitry, and other components of computers well-known to those skilled in the art.

Host computer 14 preferably implements a host application program with which a user is interacting via trackball device 12 and other peripherals, if appropriate, and which may include force feedback functionality. For example, the host application program can be a video game, word processor or spreadsheet, Web page or browser that implements HTML or VRML instructions, scientific analysis program, virtual reality training program or application, or other application program that utilizes input of device 12 and outputs force feedback commands to the device 12. Herein, for simplicity, operating systems such as Windows™., MS-DOS, MacOS™, Linux™, Be, etc. are also referred to as "application programs." In one preferred embodiment, an application program utilizes a graphical user interface (GUI) to present options to a user and receive input from the user. Herein, computer 14 may be referred as providing a "graphical environment", which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals received from the electronics and sensors of trackball device 12, and outputs force values and/or commands to be converted into forces output for trackball device 12. Suitable software drivers which interface such simulation software with computer input/output (I/O) devices are available from Immersion Corporation™ of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI.

As shown in FIG. 1, the host computer may have its own "host frame" 28 which is displayed on the display screen 26. In contrast, the device 12 has its own workspace or "local frame" in which the sphere 15 is moved. In a position control paradigm, the position (or change in position) of a user-controlled graphical object, such as a cursor, in host frame 28 corresponds to a position (or change in position) of the sphere 15 in the local frame. The offset between the object in the host frame and the object in the local frame can be changed by the user by indexing, i.e., moving the sphere 15 while no change in input is provided to the host computer. Indexing is typically not needed for a trackball since the workspace of the sphere 15 is infinite.

In alternative embodiments, the device 12 can be a different interface or control device. For example, a hand-held remote control device used to select functions of a television, video cassette recorder, sound stereo, internet or network computer (e.g., Web-TV™), mouse device, or a gamepad controller for video games or computer games, can include a sphere 15 for input and can be used with the haptic feedback components described herein. Handheld devices can still benefit from the directed inertial sensations described herein which, for example, can be output perpendicularly from the device's top surface. In yet other embodiments, the actuator 18 (and all the variations described herein) can be positioned within a handle of a large joystick, and so provide tactile sensations such as pulses and vibrations to the user grasping the joystick handle. Similarly, the actuator embodiments mentioned herein can be placed in the grasped steering wheel of a wheel controller. The actuator assembly can be scaled to the desired size to provide haptic sensations appropriate for the size and mass of the controller device.

Figure 2:
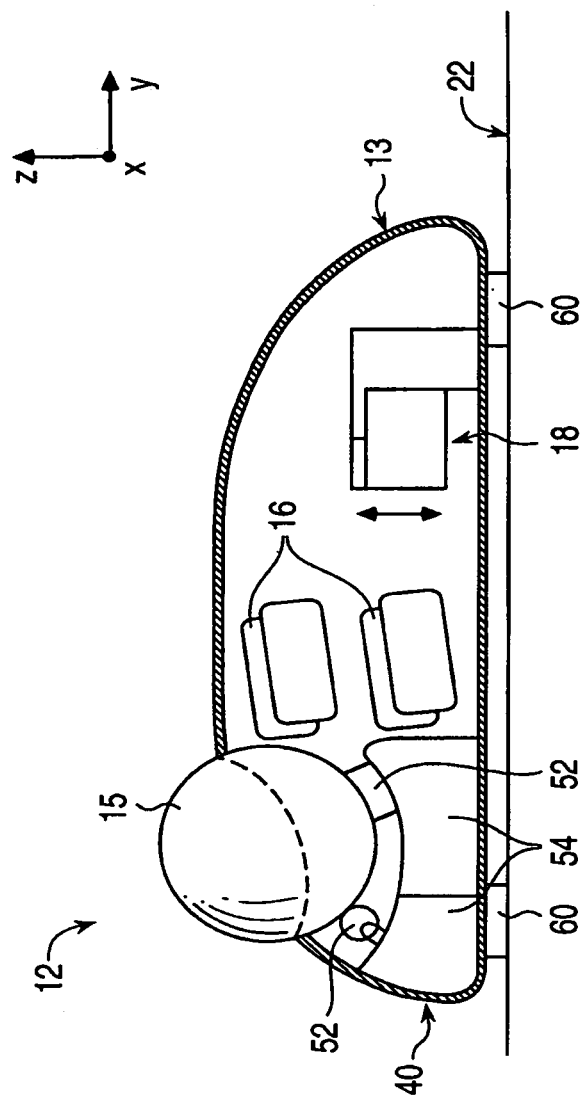
FIG. 2 is a side cross sectional view of the trackball device of FIG. 1 providing inertial forces.

FIG. 2 is a side cross-sectional view of the trackball device 12 of FIG. 1. Trackball device 12 includes one or more actuators 18 for imparting haptic feedback such as tactile sensations to the user of the device 12. The actuator outputs forces on the device 12 which the user is able to feel.

Trackball device 12 includes a housing 13, a sensing system 40, and an actuator 18. Housing 13 can be provided in a variety of shapes to allow the user to manipulate the sphere 15 and buttons 16. Sensing system 40 detects the position of the sphere in its two rotary degrees of freedom. In some embodiments, sensing system 40 can include cylindrical rollers 52 which are coupled to sensors 54, such as optical encoders, for detecting the motion of the sphere 15. Each roller 52 is frictionally coupled to the sphere 15 and rotates when the sphere 15 rotates, and the associated sensor 54 detects the rotation of the roller. A roller and sensor can be used for each of the degrees of freedom of the sphere 15, e.g. the x-direction and y-direction.

Other types of mechanisms and/or electronics for detecting motion of the sphere 15 can be used in other embodiments. For example, some trackball devices employ non-contact optical emitters and detectors to sense motion of the sphere 15. In some of these embodiments, the motion of a surface or pattern on the sphere, such as dots or bars, is detected. Such optical sensing methods can be used in the present invention. Other types of sensors can also be used, such as magnetic sensors, analog potentiometers, etc.

An actuator 18 is coupled to the housing 13 to provide haptic feedback to the user. The haptic feedback can generally be provided in two forms: inertial forces and contact forces. Inertial forces are provided by moving an inertial mass, which causes forces on the housing felt by the user. Contact forces are more direct forces applied to the user, such as by moving an element of the housing which contacts the user's hand.

A preferred embodiment creates inertial forces that are directed substantially in a particular degree of freedom, i.e. along a particular axis. The inertial forces can be created, for example, using a high bandwidth linear actuator; preferred actuators include a linear moving voice coil actuator and a linear moving-magnet actuator, which are suitable for high bandwidth actuation. A traditional servo motor used in a harmonic drive configuration can also be a suitable high bandwidth actuator. This embodiment allows for high fidelity control of force sensations in both the frequency and magnitude domains. This also allows the forces to be directed along a desired axis and allows for crisp tactile sensations that can be independently modulated in magnitude and frequency.

The preferred direction for the output forces is along the Z-axis. Since the tactile sensations are directed in a third degree of freedom relative to the two-dimensional planar surface and display screen, jolts or pulses output along the Z axis feel much more like three-dimensional bumps or divots to the user, increasing the realism of the tactile sensations and creating a more compelling interaction. For example, an upwardly-directed pulse that is output when the cursor is moved over a window border creates the illusion that the sphere or whole device 12 is moving "over" a bump at the window border.

In a first inertial force feedback embodiment, actuator 18 is preferably a linear actuator having a stationary portion coupled to the device housing 13 (and thus stationary only with respect to the portion of the housing to which it is coupled), and a moving portion that moves linearly approximately along the Z-axis. The stationary portion may include a magnet and the moving portion can include a wire coil; or these components can be reversed. An inertial mass can be coupled to the linearly-moving portion of the actuator. The actuator 18 is operative to oscillate the inertial mass quickly parallel to the Z axis. Thus, forces produced by the moving mass are transmitted to the housing through the stationary portion of the actuator 18 and felt by the user as tactile sensations. These forces are substantially directed along the Z axis and thus do not generally interfere with the user moving the sphere 15 about the x- and y-axes.

Actuator 18 can be a linear voice coil actuator as described in U.S. Pat. No. 6,243,078, which is incorporated herein by reference. In other embodiments, the stationary portion can be the coil and the moving portion can be the magnet. Actuator 18 can be other types of actuators in other embodiments. For example, a rotary actuator can be used having rotational force output that is converted to linear force output. A pager motor or other actuator having a rotating shaft, a solenoid having a vertically-moving portion, a linear voice magnet, DC current controlled linear motor, a linear stepper motor controlled with pulse width modulation of an applied voltage, a pneumatic/hydraulic actuator, a torquer (motor with limited angular range), a piezo-electric actuator, etc., can be used. A rotary actuator can be used to output a torque in a rotary degree of freedom on a shaft, which is converted to linear force and motion through a transmission, as is well known to those skilled in the art.

The actuator 18 can be placed in a variety of positions within the housing 13. For example, one preferred embodiment places the actuator on the bottom portion of the housing, as close to the center of the device 12 along both the X and Y axes as possible. In other embodiments, the actuator 18 can be positioned centered along one axis but off-center along the other axis to accommodate other electronic and mechanical components in the device, e.g. near the front or back of the housing 13. In yet other embodiments, the actuator 18 can be connected to a side or top portion of the housing 13 rather than the bottom portion, although it is preferred that the actuator be oriented to output forces approximately along the Z-axis (and thus the top may be preferable to the side). A variety of tactile sensations can be output to the user, many of which are described in greater detail below with respect to FIG. 6.

The magnitude of forces that can be output with respect to an inertial ground are not as high as can be output with respect to an earth ground. The larger the inertial mass, the larger the forces that can be output, so the theoretical limit of force magnitude is very high. Since the trackball device housing 13 does not need to be moved by the user to operate the device, the inertial mass can be made fairly large to provide higher magnitude forces. Size may be a constraint, however, in some devices.

In addition, a high bandwidth actuator can be used to compensate for lower-magnitude forces, i.e., an actuator that can output abrupt changes in force magnitude level. Since the human hand is more sensitive to changes in force level than to absolute force levels, a high bandwidth actuator used to convey low level forces produced with respect to an inertial ground can be quite effective in producing compelling tactile sensations.

An additional challenge of applying a compelling tactile sensation to the housing 13 along the described Z axis is that the trackball device 12 sits upon a table or other surface 22 and is therefore physically grounded along that Z axis. In other words, the forces applied by the actuator 18 along the Z axis, with respect to the inertial mass, are countered by the normal forces applied by the table surface upon the housing. One way to accommodate these countering forces and to allow greater magnitude forces to be felt by the user is to provide compliance between the surface 22 and a portion of the housing that is contacted by the user. In a preferred embodiment, a flexible or semi-flexible surface is provided between the housing 13 and the surface 22. For example, a number of compliant feet 60 can be coupled to the underside of the housing 13 to make contact with surface 22. The feet 60 can be made out of a material such as rubber, foam, or the like. Preferably, the feet have a high compliance in the z-axis to allow the desired magnitude of haptic sensations in the z-axis. Descriptions of tuning compliance to provide greater-magnitude forces are provided in U.S. Pat. No. 6,680,729, incorporated herein by reference. In other embodiments, a whole layer of compliant material can be positioned underneath or coupled to the underside of the housing 13.

In other embodiments, the desired compliance can be provided in other or additional elements of the device 12. For example, a cover portion of the device can be flexibly or moveably coupled to a base portion of the device 12, where z-axis motion between these portions magnifies the haptic sensations. In one embodiment, the top half of the housing 13 which the user contacts can be coupled to the bottom half by a rubber joint or other flexible layer or coupling. In other embodiments, the contacted cover portion can be a smaller portion of the top surface of the housing 13 which is compliant, e.g. a rubber diaphragm. It should be noted that such a compliant cover portion is not driven directly by the actuator (as is the case for the contact forces of FIG. 4), but is provided to more efficiently transmit inertial forces to the user.

Alternate embodiments include coupling the stationary portion of the actuator 18 to a portion of the housing 13 that is different from the base or bottom portion of the housing (e.g. the side of the housing), and providing an amount of flex between the actuator-coupled portion of the housing and the base portion that is in contact with the surface 22. For example, flexible hinges or connecting members can couple the two portions. This can improve the transmissibility of the tactile sensations, leader to greater magnitude forces.

A different implementation that may be used for generating tactile sensations is a motor (or other actuator) having a rotating shaft, where an inertial mass is connected to the shaft at an off-center point of the mass. The inertial mass is rotated around the motor shaft with respect to the interface device at various speeds. This can create sinusoidal force signals at various frequencies depending upon the current driven through the motor. One problem with such a methodology is slow response time because the spinning mass must accelerate and decelerate over time to achieve the rotational velocity corresponding to a desired frequency output. Also, this implementation applies forces in a continually changing direction confined to the plane of rotation of the mass, which may provide a "wobble" sensation that can be disconcerting to the user at slow frequencies.

Alternatively, directed inertial forces can be output along the X and Y axes in the planar workspace of the device and can be compensated for to prevent or reduce interference with the user's control of the device. One method to compensate is to actively filter imparted jitter in that workspace, as disclosed in U.S. Pat. No. 6,020,876, incorporated herein by reference; however, this implementation may add complexity and cost to the device 12. One problem in the present invention for outputting forces in the X and Y directions is that the housing 13 is typically made stiff in those directions, such that forces will not be easily felt. For example, the rubber feet 60 can be made compliant in the z-direction, but such compliance does not greatly help to magnify forces output in the X- and/or Y-axes. The rubber feet 60 are typically stiff in the x-y plane to prevent the housing 13 from wobbling when the user uses the device 12.

Buttons 16 can be selected by the user as a "command gesture" when the user wishes to input a command signal to the host computer 14. The user pushes a button 16 down (in the degree of freedom of the button approximately along axis z) to provide a command to the computer. The command signal, when received by the host computer, can manipulate the graphical environment in a variety of ways. In one embodiment, an electrical lead can be made to contact a sensing lead as with any mechanical switch to determine a simple on or off state of the button. An optical switch or other type of digital sensor can alternatively be provided to detect a button press. In a different continuous-range button embodiment, a sensor can be used to detect the precise position of the button 16 in its range of motion (degree of freedom). In some embodiments, one or more of the buttons 16 can be provided with force feedback (in addition to the inertial tactile feedback from actuator 18), as described in U.S. Pat. No. 6,243,078.

Figure 3:
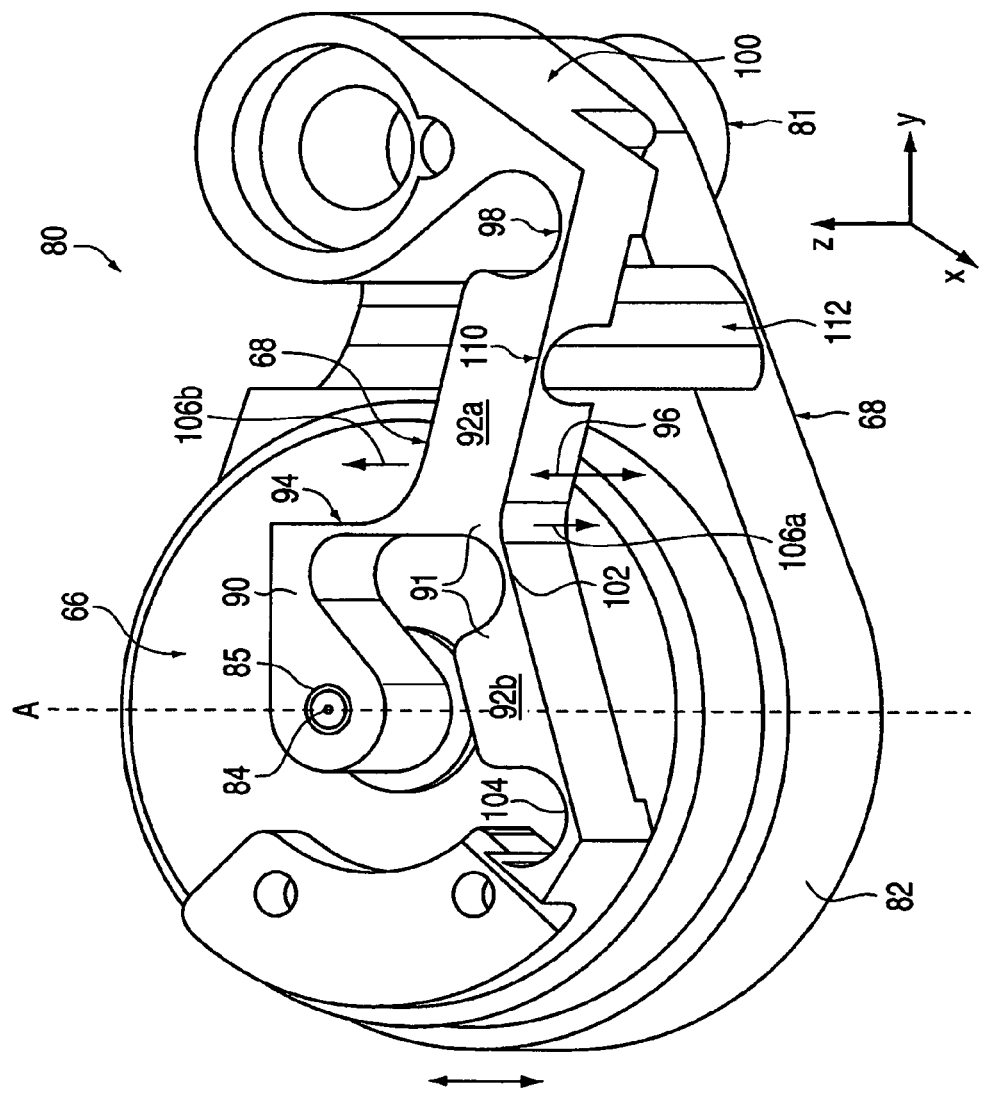
FIG. 3 is a perspective view of one embodiment of an actuator assembly suitable for use with the present invention.

FIG. 3 shows an example of an actuator assembly 80 that can be used in the present invention. In this embodiment, the actuator itself is used as the inertial mass. An actuator assembly is used that includes a flexure for providing inertia forces and which includes an inherent spring bias that brings the inertial mass back to an origin position when no forces are output on the mass.

Actuator assembly 80 includes a grounded flexure 68 and an actuator 66 coupled to the flexure 68. The flexure 68 is preferably a single, unitary piece made of a material such as polypropylene plastic ("living hinge" material) or other flexible material. This type of material is durable and allows flexibility of the flex joints (hinges) in the flexure when one of the dimensions of the joint is made small, but is also rigid in the other dimensions, allowing structural integrity as well as flexibility depending on thickness. Some embodiments of flexures used in force feedback devices are described in U.S. Pat. Nos. 5,805,140, 6,639,581 and 6,693,626, all incorporated herein by reference. Flexure 68 can be grounded to the housing 13, for example, at portion 81.

Actuator 66 is shown coupled to the flexure 68. The housing of the actuator is coupled to a receptacle portion 82 of the flexure 68 which houses the actuator 66 as shown. Preferably, an amount of space is provided above and below the actuator 66 and receptacle portion 82 to allow motion of the actuator 66 in the z-axis; thus, the receptacle portion 82 should not be coupled to ground since it moves to provide an approximately linear motion, as explained below.

A rotating shaft 84 of the actuator is coupled to the flexure 68 in a bore 85 of the flexure 68 and is rigidly coupled to a central rotating member 90. The rotating shaft 84 of the actuator is rotated about an axis A which also rotates member 90 about axis A. Rotating member 90 is coupled to a first portion 92*a* of an angled member 91 by a flex joint 94. The flex joint 94 preferably is made very thin in the dimension it is to flex, i.e. one of the x- or y-axis dimensions (the y-axis dimension for the embodiment of FIG. 3), so that the flex joint 94 will bend when the rotating portion 90 moves the first portion 92*a* approximately linearly. The first portion 92*a* is coupled to the grounded portion 100 of the flexure by a flex joint 98 and the first portion 92*a* is coupled to a second portion 92*b* of the angled member by flex joint 102. The second portion 92*b*, in turn, is coupled at its other end to the receptacle portion 82 of the flexure by a flex joint 104.

The angled member 91 that includes first portion 92*a* and second portion 92*b* moves approximately linearly along the x-axis as shown by arrow 96. When the flexure is in its origin position (rest position), the portions 92*a* and 92*b* are preferably angled as shown with respect to their lengthwise axes. This allows the rotating member 90 to push or pull the angled member 91 along either direction as shown by arrow 96. This configuration allows forces output by the actuator to be magnified as they are transmitted to the moveable receptacle portion 82 and to the moving element of the interface device (inertial mass, cover portion, button, etc.). The actual force output depends on the angle of the opposing portions 92*a* and 92*b* with respect to each other's lengthwise axes (or with respect to the y-axis).

The actuator 66 is operated in only a fraction of its rotational range when driving the rotating member 90 in two directions, allowing high bandwidth operation and high frequencies of pulses or vibrations to be output. The resulting motion of the angled member 91 compresses or stretches the flexure with respect to the grounded portion 81. To channel this compression or stretching into the desired z-axis motion, a flex joint 112 is provided in the flexure portion between the receptacle portion 82 and the grounded portion 100. Flex joint 112 is oriented to flex along the z-axis (i.e. provide rotation about an x-axis), unlike the flex joints 94, 98, 102, and 104, which flex in the x-y plane (provide rotation about a z-axis). The flex joint 112 allows the receptacle portion 82 (as well as the actuator 66, rotating member 90, and second portion 92*b*) to move linearly in the z-axis in response to motion of the portions 92*a* and 92*b*. In actuality, the receptacle portion 82 and actuator 66 move only approximately linearly, since they have a small arc to their travel; however, this arc is small enough to be ignored for most practical purposes. Thus, when the rotational motion of the rotating member 90 causes the ends of the angled member 91 to move further apart (direction 106*a*), the receptacle portion flexes down about flex joint 112 along the z-axis. Similarly, if the ends of angled member 91 are made to move closer together (direction 106*b*), the receptacle 82 and actuator 66 move upwardly along the z-axis, in effect lifting the actuator 66 upward. A flex joint 110 is provided in the first portion 92*a* of the angled member 91 to allow the flexure about flex joint 112 in the z-direction to more easily occur. The essential elements of the schematic embodiment shown in FIG. 3 can be implemented with a wide variety of components, including mechanical couplings such as bearings, pin joints, etc.

By quickly changing the rotation direction of the actuator shaft 84, the actuator/receptacle can be made to oscillate along the z-axis and create a vibration on the housing with the actuator 66 acting as an inertial mass. Preferably, enough space is provided above and below the actuator to allow its range of motion without impacting any surfaces or portions of the housing 13, since such impacts can degrade the quality of the pulse, vibrations, and other haptic sensations output to the user.

In addition, the flex joints included in flexure 68, such as flex joint 112, act as spring members to provide a restoring force toward the origin position (rest position) of the actuator 66 and receptacle portion 82. This centering spring bias reduces the work required by the actuator to move itself since the actuator output force need only be deactivated once the actuator reaches a peak or valley position in its travel. The spring bias brings the actuator back to its rest position without requiring actuator force output. This system can be tuned so that amplification of forces output by the actuator is performed at a efficient level, e.g. near the natural frequency of the system. Tuning such a harmonic system using an inertial force actuator and compliant suspension of a moving mass is described in greater detail in U.S. Pat. No. 6,680,729, which is incorporated herein by reference. For example, in the flexure 68, the spring constants can be tuned by adjusting the thickness of the flex joints 94, 102, 98, 104, 110, and/or 112 (in the dimension in which they are thin). In some embodiments, additional springs can be added to provide additional centering forces if desired, e.g. mechanical springs such as leaf springs.

The flexure 68 is advantageous in the present invention because it has an extremely low cost and ease of manufacturability, yet allows high-bandwidth forces to be transmitted as inertial forces. Since the flexure 68 is a unitary member, it can be manufactured from a single mold, eliminating significant assembly time and cost. Furthermore, it is rigid enough to provide strong vibrations with respect to the housing and to provide significant durability. In addition, the flexure provides close to zero backlash and does not wear out substantially over time, providing a long life to the product.

Providing the actuator 66 as the inertial mass that is driven in the z-axis has several advantages. For example, this embodiment saves the cost of providing a separate inertial mass and saves space and total weight in the device, which are important considerations in the home consumer market. Another advantage of the actuator assembly 80 is that it has a very low profile in the z-axis dimension. This is allowed by the orientation of the actuator 66 in the x-y plane, e.g. the axis of rotation A of the actuator shaft 84 is parallel to the z-axis. This makes the actuator assembly 80 very suitable for use in low-profile housings.

In some embodiments, a larger actuator 66 can be used to both output greater magnitude forces and to act as a larger inertial mass, resulting in higher magnitude haptic sensations as experienced by the user. Or, an additional mass can be coupled to the actuator 66 shown in the embodiment of FIG. 3 to provide a larger mass and overall higher-magnitude haptic sensations. When tuning the system for such forces, the resonant frequency of the system should remain the same (e.g. 25 Hz is one tested frequency). Thus, the stiffness of the flexure 68 may have to be modified to maintain the desired resonant frequency when increasing the size of the inertial mass. Members of the flexure can be stiffened by increasing their width or by providing a stiffer material.

Of course, in other embodiments, the actuator need not be used as the inertial mass. For example, U.S. Pat. No. 6,693,626, incorporated herein by reference, discloses an actuator coupled to a flexure that provides a centering spring bias to a separate inertial mass coupled to the flexure, or an inertial mass that is incorporated as part of the flexure.

Figure 4:
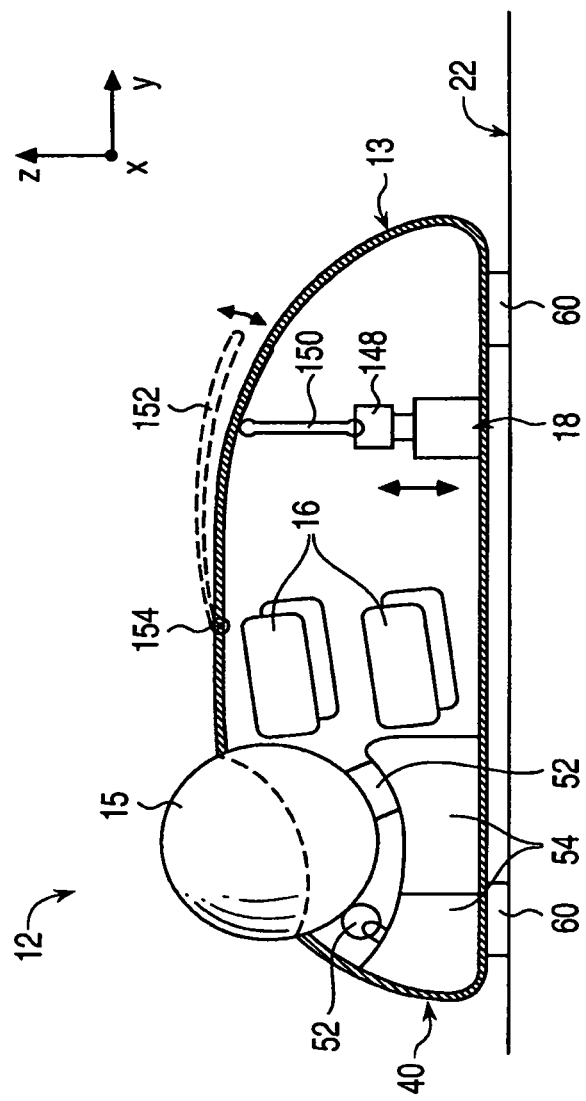
FIG. 4 is a side cross sectional view of the trackball device of FIG. 1 providing contact forces.

FIG. 4 is a side elevational view illustrating another embodiment 200 of the present invention, in which contact forces are applied to the user. In general, a moving element is provided on the surface of the housing and is moved by the actuator 18. The user contacts the moving element with a portion of his or her hand and thus directly feels the motion of the element.

In the example of FIG. 4, actuator 18 has a moving portion 148 which moves along the z-axis as described above with reference to FIG. 2. The moving portion 148 is coupled to a link member 150, which is coupled to a moveable cover portion 152 at its other end. The link member can be rotatably coupled to the actuator and rotatably coupled to the cover portion 152 by mechanical bearings or other types of couplings, such as flex joints.

The cover portion 152 is preferably the same material as the housing 13 and is preferably movably coupled to the housing 13. For example, a mechanical hinge 154 can be used to provide a rotational coupling between cover portion 152 and housing 13. Alternatively, a flexure or other moveable coupling can be used to allow rotational or linear motion of the cover portion. The cover portion 152 can also be made of a flexible material that can flex to provide its motion and contact forces to the user, such as a rubber diaphragm.

The approximate linear motion of the actuator's moving portion 148 can be used to drive the cover portion 150. Linear forces from the actuator 18 move the link member 150 and in turn move the cover portion 152 approximately along the Z-axis. Although the cover portion 152 actually rotates about the hinge in the embodiment of FIG. 4, the range of motion is preferably small enough to approximate linear motion. Preferably, the cover portion 152 has an origin position (rest position) in the middle of its range of motion so that the actuator 18 can move it both up and down. Also, a centering spring bias is preferably provided to move the cover portion to the origin position when no force is applied by the actuator (and by the user). These embodiment are described in greater detail in U.S. Pat. No. 6,088,019, incorporated herein by reference.

In other embodiments, different moving elements can be actuated to provide contact forces. For example, a button 16 can be coupled to a link member 150 or more directly to a moving portion of actuator 18. The button 16 can be moved in its degree of freedom by the actuator to provide contact forces to a user who is contacting the button. As with the cover portion 152, the button is preferably centered in its range of motion by a centering spring bias provided by a physical spring or compliance in the button. This embodiment is described in greater detail in U.S. Pat. No. 6,243,078, incorporated herein by reference.

Like the trackball device providing inertial forces, the actuator system providing contact forces can be tuned to amplify output forces. Feet 60 can be made compliant, and compliance can also be used in the actuator's moving member 148, the link member 150, and the moving element itself, where appropriate.

Of course, both the inertial forces described with reference to FIGS. 2 and 3 as well as the contact forces of FIG. 4 can be included in a single embodiment. For example, the link member 150 and moving element (cover portion, button, or other moving member) can be coupled to the moving inertial mass. Such an embodiment advantageously provides inertial forces that can always be felt by the user, regardless of how the housing is contacted, as well as contact forces which can be compelling in particular situations.

Figure 5:
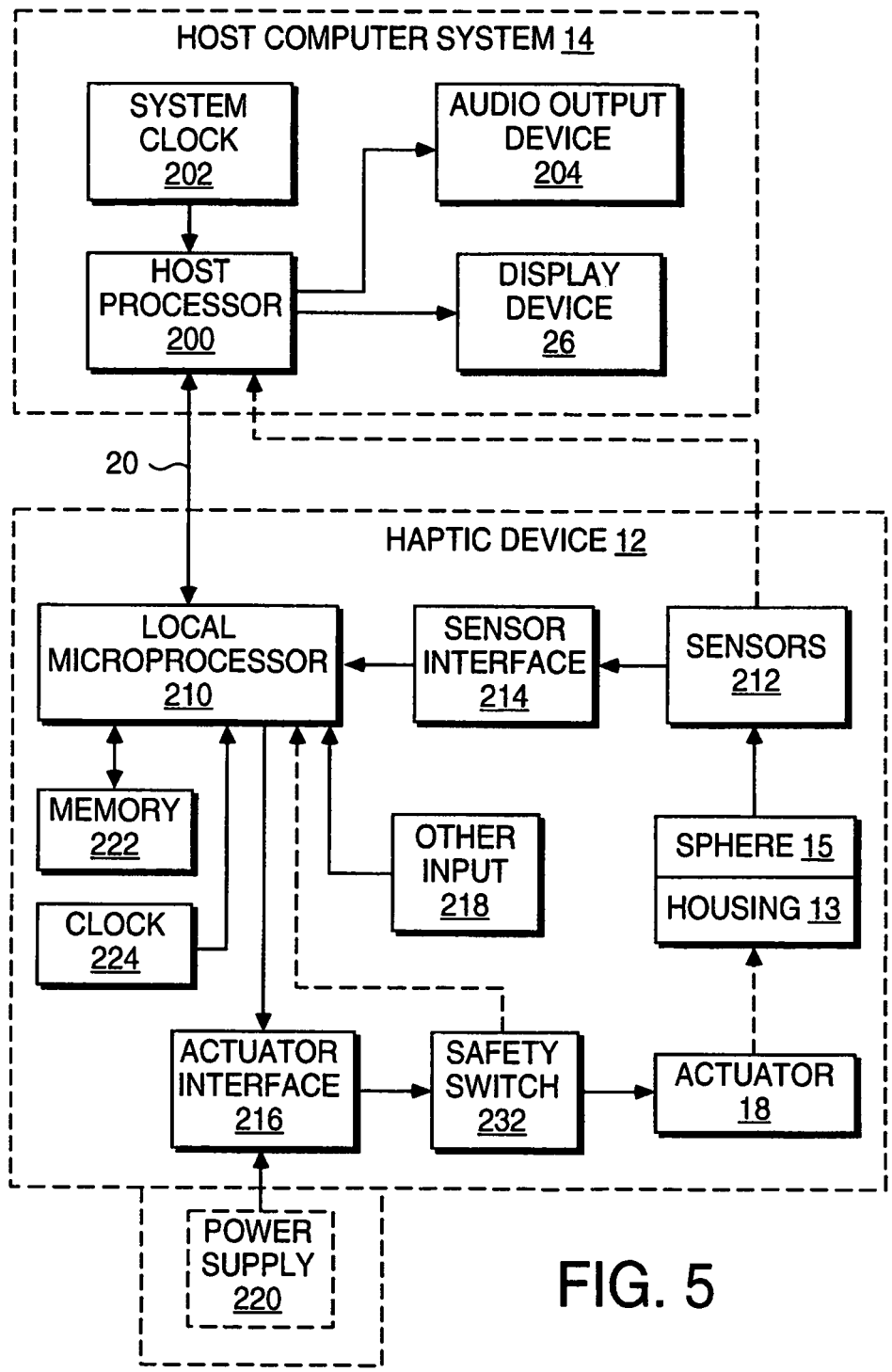
FIG. 5 is a block diagram of the haptic device and host computer of the present invention.

FIG. 5 is a block diagram illustrating one embodiment of the force feedback system of the present invention including a local microprocessor and a host computer system.

Host computer system 14 preferably includes a host microprocessor 200, a clock 202, a display screen 26, and an audio output device 204. The host computer also includes other well known components, such as random access memory (RAM), read-only memory (ROM), and input/output (I/O) electronics (not shown). Display screen 26 displays images of a game environment, operating system application, simulation, etc. Audio output device 204, such as speakers, is preferably coupled to host microprocessor 200 via amplifiers, filters, and other circuitry well known to those skilled in the art and provides sound output to user when an "audio event" occurs during the implementation of the host application program. Other types of peripherals can also be coupled to host processor 200, such as storage devices (hard disk drive, CD ROM drive, floppy disk drive, etc.), printers, and other input and output devices.

Trackball device 12 is coupled to host computer system 14 by a bi-directional bus 20 The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to actuator 18.

Device 12 can include a local microprocessor 210. Local microprocessor 210 can optionally be included within the housing of device 12 to allow efficient communication with other components of the device. Processor 210 is considered local to device 12, where "local" herein refers to processor 210 being a separate microprocessor from any processors in host computer system 14. "Local" also preferably refers to processor 210 being dedicated to haptic feedback and sensor I/O of device 12. Microprocessor 210 can be provided with software instructions to wait for commands or requests from computer host 14, decode the command or request, and handle/control input and output signals according to the command or request. In addition, processor 210 can operate independently of host computer 14 by reading sensor signals and calculating appropriate forces from those sensor signals, time signals, and stored or relayed instructions selected in accordance with a host command. Some examples of microprocessors that can be used as local microprocessor 210 include the MC68HC711E9 by Motorola, the PIC16C74 by Microchip, and the 82930AX by Intel Corp., for example, as well as more sophisticated force feedback processors such as the Immersion™ Touchsense™ Processor from Immersion Corp. Microprocessor 210 can include one microprocessor chip, multiple processors and/or co-processor chips, and/or digital signal processor (DSP) capability.

Microprocessor 210 can receive signals from sensor 212 and provide signals to actuator 18 in accordance with instructions provided by host computer 14 over bus 20. For example, in a local control embodiment, host computer 14 provides high level supervisory commands to microprocessor 210 over bus 20, and microprocessor 210 decodes the commands and manages low level force control loops to sensors and the actuator in accordance with the high level commands and independently of the host computer 14. This operation is described in greater detail in U.S. Pat. Nos. 5,739,811 and 5,734,373, both incorporated by reference herein. In the host control loop, force commands are output from the host computer to microprocessor 210 and instruct the microprocessor to output a force or force sensation having specified characteristics. The local microprocessor 210 reports data to the host computer, such as locative data that describes the position of the sphere 15 in one or more provided degrees of freedom. The data can also describe the states of buttons 16 and safety switch 232. The host computer uses the data to update executed programs. In the local control loop, actuator signals are provided from the microprocessor 210 to actuator 18 and sensor signals are provided from the sensor 212 and other input devices 218 to the microprocessor 210. Herein, the term "tactile sensation" refers to either a single force or a sequence of forces output by the actuator 18 which provide a sensation to the user. For example, vibrations, a single jolt, or a texture sensation are all considered tactile sensations. The microprocessor 210 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other hardware can be provided locally to device 12 to provide functionality similar to microprocessor 210. For example, a hardware state machine incorporating fixed logic can be used to provide signals to the actuator 18 and receive sensor signals from sensors 212, and to output tactile signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 14 can provide low-level force commands over bus 20, which are directly transmitted to the actuator 18 via microprocessor 210 or other circuitry. Host computer 14 thus directly controls and processes all signals to and from the device 12, e.g. the host computer directly controls the forces output by actuator 18 and directly receives sensor signals from sensor 212 and input devices 218. This embodiment may be desirable to reduce the cost of the force feedback device yet further, since no complex local microprocessor 210 or other processing circuitry need be included in the device. Furthermore, since one actuator 18 is used with forces not provided in the primary sensed degrees of freedom, the local control of forces by microprocessor 210 may not be necessary in the present invention to provide the desired quality of forces.

In the simplest host control embodiment, the signal from the host to the device can be a single bit that indicates whether to pulse the actuator at a predefined frequency and magnitude. In a more complex embodiment, the signal from the host could include a magnitude, giving the strength of the desired pulse. In yet a more complex embodiment, the signal can include a direction, giving both a magnitude and a sense for the pulse. In still a more complex embodiment, a local processor can be used to receive a simple command from the host that indicates a desired force value to apply over time. The local microprocessor then outputs the force value for the specified time period based on the one command, thereby reducing the communication load that must pass between host and device. In an even more complex embodiment, a high-level command with tactile sensation parameters can be passed to the local processor on the device which can then apply the full sensation independent of host intervention. Such an embodiment allows for the greatest reduction of communication load. Finally, a combination of numerous methods described above can be used for a single device 12.

Local memory 222, such as RAM and/or ROM, is preferably coupled to microprocessor 210 in device 12 to store instructions for microprocessor 210 and store temporary and other data. For example, force profiles can be stored in memory 222, such as a sequence of stored force values that can be output by the microprocessor, or a look-up table of force values to be output based on the current position of the user object. In addition, a local clock 224 can be coupled to the microprocessor 210 to provide timing data, similar to the system clock of host computer 14; the timing data might be required, for example, to compute forces output by actuator 18 (e.g., forces dependent on calculated velocities or other time dependent factors). In embodiments using the USB communication interface, timing data for microprocessor 210 can be alternatively retrieved from the USB signal.

For example, host computer 14 can send a "spatial representation" to the local microprocessor 210, which is data describing the locations of some or all the graphical objects displayed in a GUI or other graphical environment which are associated with forces and the types/characteristics of these graphical objects. The microprocessor can store such a spatial representation in local memory 222, and thus will be able to determine interactions between the user object and graphical objects (such as the rigid surface) independently of the host computer. In addition, the microprocessor can be provided with the necessary instructions or data to check sensor readings, determine cursor and target positions, and determine output forces independently of host computer 18. The host could implement program functions (such as displaying images) when appropriate, and synchronization commands can be communicated between the microprocessor and host 18 to correlate the microprocessor and host processes. Also, the local memory can store predetermined force sensations for the microprocessor that are to be associated with particular types of graphical objects. Alternatively, the computer 14 can directly send force feedback signals to the device 12 to generate tactile sensations.

Sensors 212 sense the position or motion of the device (e.g. the sphere 15) in its degrees of freedom and provides signals to microprocessor 210 (or host 14) including information representative of the position or motion. Sensors suitable for detecting motion of a trackball sphere include digital optical encoders frictionally coupled to the sphere, as is well known to those skilled in the art. Optical sensor systems, linear optical encoders, potentiometers, optical sensors, velocity sensors, acceleration sensors, strain gauge, or other types of sensors can also be used, and either relative or absolute sensors can be provided. Optional sensor interface 214 can be used to convert sensor signals to signals that can be interpreted by the microprocessor 210 and/or host computer system 14, as is well known to those skilled in the art.

Actuator 18 transmits forces to the housing 13 of the device 12 as described above with reference to FIG. 2 in response to signals received from microprocessor 210 and/or host computer 14. Actuator 18 can be a linear or rotary voice coil motor, linear or rotary DC motor, solenoid, pager motor, moving magnet actuator, piezo-electric actuator, etc. Actuator 18 is provided to generate inertial forces by moving an inertial mass; in the preferred embodiment, the mass is moved linearly and approximately perpendicular to the surface on which the device is supported, and thus the actuator 18 does not generate force in the degrees of freedom of motion of the sphere. Actuator 18 instead provides "informative" or "effect" forces that do not resist or assist motion. Actuator 18 can additionally or alternatively drive a moving element to provide contact forces as described above. The sensors 212 detect the position/motion of the device 12 in its planar degrees of freedom, and this sensing is not substantially affected by the output of forces by actuator 18.

The actuator described herein has the ability to apply short duration force sensation on the housing of the device (and/or on the user's hand). This short duration force sensation is described herein as a "pulse." Ideally the "pulse" is directed substantially along a Z axis orthogonal to the X-Y plane of the support surface 22. In progressively more advanced embodiments, the magnitude of the "pulse" can be controlled; the sense of the "pulse" can be controlled, either positive or negative biased; a "periodic force sensation" can be applied on the housing, where the periodic sensation can have a magnitude and a frequency, e.g. a sine wave; the periodic sensation can be selectable among a sine wave, square wave, saw-toothed-up wave, saw-toothed-down wave, and triangle wave; an envelope can be applied to the period signal, allowing for variation in magnitude over time; and the resulting force signal can be "impulse wave shaped" as described in U.S. Pat. No. 5,959,613. There are two ways the period sensations can be communicated from the host to the device. The wave forms can be "streamed" as described in U.S. Pat. Nos. 5,959,613 and 6,411,276, both incorporated herein by reference. Or the waveforms can be conveyed through high level commands that include parameters such as magnitude, frequency, and duration, as described in U.S. Pat. No. 5,734,373.

Alternate embodiments can employ additional actuators for providing tactile sensations or forces in the planar degrees of freedom of the device 12. For example, the device 12 can be enhanced with a secondary actuator that outputs forces on the sphere 15 to resist and/or assist motion of the sphere. For example, frictional rollers coupled to the sphere can be driven by actuators, as described in U.S. Pat. Nos. 5,623,582 and 5,889,670, both incorporated herein by reference. In some embodiments, because of power constraints, this second actuator can be passive (i.e., it dissipates energy). The passive actuator can be a brake, such as a brake employing a very low power substrate such as a magneto-rheological fluid. Alternatively it could be a more traditional magnetic brake. The sphere can be rotated freely so long as the passive brake is not engaged. When the brake is engaged, the user can feel the passive resistance to motion of the sphere (in one and/or two degrees of freedom). The passive resistance can allow additional feel sensations that supplement the "pulse" and "vibration" sensations (described with reference to FIG. 6).

In yet other embodiments, an actuator can be provided to output the tactile feedback (such as pulses and vibrations) to the sphere 15 itself instead of or in addition to the tactile feedback applied to the housing 13. For example, a linear or rotary actuator can output pulses on the sphere 15 by vibrating a cylindrical roller in contact with the sphere. Or, a moving portion of an actuator can directly impact the sphere. However, such tactile sensations on the sphere may cause inaccurate cursor control or input for the user, which is generally undesirable. A selective disturbance filter, as described in U.S. Pat. No. 6,020,876, can be used to filter out the force disturbances on the cursor control. However, in some embodiments this may not be adequate since vibrations on the sphere are difficult to sense with accuracy and therefore difficult to filter. Other embodiments may provide accurate enough sensors, such as multiple emitter/detector pairs sensing small motions of the sphere, which can allow for adequate disturbance filtering.

Actuator interface 216 can be optionally connected between actuator 18 and microprocessor 210 to convert signals from microprocessor 210 into signals appropriate to drive actuator 18. Interface 216 can include power amplifiers, switches, digital to analog controllers (DACs), analog to digital controllers (ADCs), and other components, as is well known to those skilled in the art.

Other input devices 218 are included in device 12 and send input signals to microprocessor 210 or to host 14 when manipulated by the user. Such input devices include buttons 16 and can include additional buttons, dials, joysticks, switches, scroll wheels, or other controls or mechanisms. These other input devices 218 can be positioned on the housing 13 in some embodiments.

Power supply 220 can optionally be included in device 12 coupled to actuator interface 216 and/or actuator 18 to provide electrical power to the actuator. or be provided as a separate component. Alternatively, and more preferably, power can be drawn from a power supply separate from device 12, or power can be received across a USB or other bus. Also, received power can be stored and regulated by device 12 and thus used when needed to drive actuator 18 or used in a supplementary fashion. Because of the limited power supply capabilities of USB, a power storage device may be required in the device to ensure that peak forces can be applied (as described in U.S. Pat. No. 5,929,607, incorporated herein by reference). For example, power can be stored over time in a capacitor or battery and then immediately dissipated to provide a jolt sensation to the device. Alternatively, this technology can be employed in a wireless device 12, in which case battery power is used to drive the tactile actuator. In one embodiment, the battery can be charged by an electric generator on board the device 12, the generator driven by the user's motions of the device. For example, the sphere 15 can turn a frictional roller or shaft that is coupled to and recharges the generator.

A safety switch 232 can optionally be included to allow a user to deactivate actuator 18 for safety reasons. For example, the user must continually activate or close safety switch 232 during operation of device 12 to enable the actuator 18. If, at any time, the safety switch is deactivated (opened), power from power supply 220 is cut to actuator 18 (or the actuator is otherwise disabled) as long as the safety switch is opened. Embodiments include an optical switch, an electrostatic contact switch, a button or trigger, a hand weight safety switch, etc.

Figure 6:
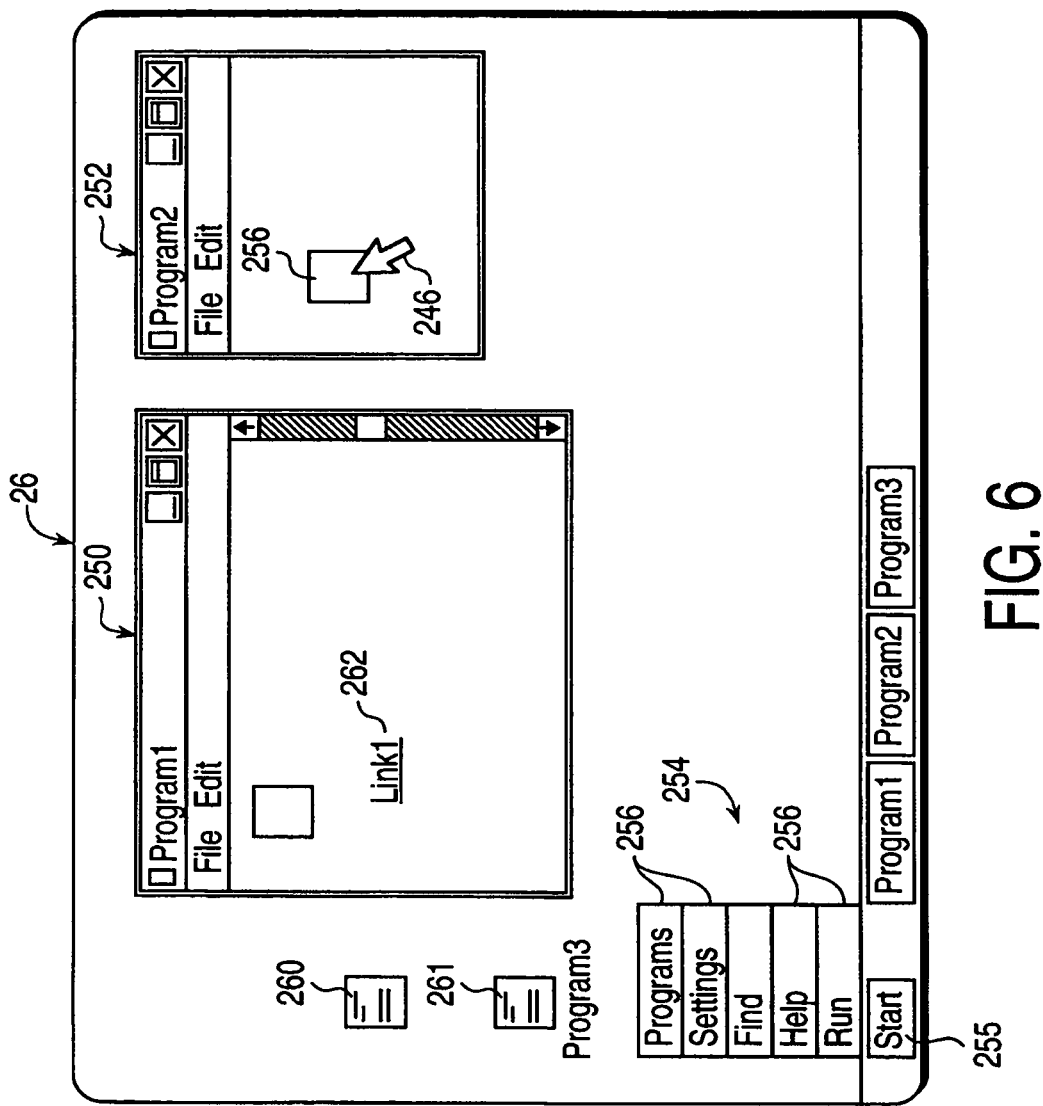
FIG. 6 is a diagrammatic view of a display screen showing graphical objects associated with force sensations output using the haptic device of the present invention.

FIG. 6 is a diagram of display screen 26 of host computer 14 showing a graphical user interface for use with the present invention, which is one type of graphical environment with. which the user can interact using the device of the present invention. The haptic feedback trackball device 12 of the present invention can provide tactile sensations that make interaction with graphical objects more compelling and more intuitive. The user typically controls a cursor 246 to select and manipulate graphical objects and information in the graphical user interface. The cursor is moved according to a position control paradigm, where the position of the cursor corresponds to a position of the sphere in its rotational workspace. Windows 250 and 252 display information from application programs running on the host computer 14. Menu elements 256 of a menu 254 can be selected by the user after a menu heading or button such as start button 255 is selected. Icons 256, 260, and 261 and web links 262 are displayed features that can also be selected. Tactile sensations associated with these graphical objects can be output using actuator 18 based on signals output from the local microprocessor or host computer.

A basic tactile functionality desired for the device described herein is a "pulse" (or jolt) sensation that is output when the cursor is (a) moved between menu elements 256 of a menu 254, (b) moved on to an icon 256, button, hyperlink 262, or other graphical target, (c) moved across a boundary of a window 250 or 252, (d) moved over application-specific elements in a software title such as nodes in a flow chart, the points of a drawing, or the cells of a spread sheet. The appropriate sensation for this simple cursor interaction is a quick, abrupt "pulse" or "pop." This can be achieved by applying a crisp, short force between the inertial mass and the housing of the device, e.g. by moving the inertial mass in one or a small number of oscillations. For example, a pulse can include a single impulse of force that quickly rises to a desired magnitude and then is turned off or quickly decays back to zero or small magnitude.

A vibration can also be output, which can include a series of pulses applied periodically over a particular time period at a particular frequency. The time-varying force can be output according to a force vs. time waveform that is shaped like a sine wave, triangle wave, sawtooth wave, or other shape of wave. The vibration is caused by an inertial mass and/or moving contact element oscillating back and forth.

In some embodiments, the sensation of a "spatial texture" may be output by correlating pulses and/or vibrations with the motion of the cursor over a graphical object or area. This type of force can depend on the position of the sphere 15 in its workspace (or on the position of the cursor in the graphical user interface). For example, the cursor can be dragged over a graphical grating and pulses can be correlated with the spacing of the grating. Thus, texture bumps are output depending on whether the cursor has moved over the location of a bump in a graphical object; when the sphere is positioned between "bumps" of the texture, no force is output, and when the sphere moves over a bump, a force is output. This can be achieved by host control (e.g., the host sends the pulses as the cursor is dragged over the grating) or by local control (e.g., the host sends a high level command with texture parameters and the sensation is directly controlled by the device). In other cases a texture can be performed by presenting a vibration to a user, the vibration being dependent upon the current velocity of the sphere in its workspace. When the sphere is stationary, the vibration is deactivated; as the sphere moves faster, the frequency and magnitude of the vibration is increased. This sensation could be controlled locally by the device processor, or be controlled by the host. Local control by the device may eliminate communication burden in some embodiments. Other spatial force sensations can also be output. In addition, any of the described force sensations herein can be output by actuator 18 simultaneously or otherwise combined as desired.

The host computer 14 can coordinate tactile sensations with interactions or events occurring within the host application. The individual menu elements 256 in the menu can be associated with forces. In one interaction, when the cursor is moved across menu elements 256 in menu 254 of the graphical user interface, "pulse" sensations are applied. The sensations for certain menu choices can be stronger than others to indicate importance or frequency of use, i.e., the most used menu choices can be associated with higher-magnitude (stronger) pulses than the less used menu choices. Also, disabled menu choices can have a weaker pulse, or no pulse, to indicate that the menu choice is not enabled at that time. Furthermore, when providing tiled menus in which a submenu is displayed after a particular menu element is selected, as in Microsoft Windows.sup.198, pulse sensations can be sent when a sub-menu is displayed. This can be very useful because users may not expect a sub-menu to be displayed when moving a cursor on a menu element.

Pulse sensations can also be output based on interaction between cursor 246 and a window. For example, a pulse can be output when the cursor is moved over a border of a window 250 or 252 to signal the user of the location of the cursor. When the cursor 246 is moved within the window's borders, a texture force sensation can be output. The texture can be a series of bumps that are spatially arranged within the area of the window in a predefined pattern; when the cursor moves over a designated bump area, a pulse sensation is output when the cursor moves over designated pulse points or lines. A pulse can also be output when the cursor is moved over a selectable object, such as a link 262 in a displayed web page or an icon 256. A vibration can also be output to signify a graphical object which the cursor is currently positioned over. Furthermore, features of a document displaying in window 250 or 252 can also be associated with force sensations.

In another interaction, when the cursor is moved over an icon 256, folder, hyperlink 262, or other graphical target, a pulse sensation is applied. The sensation associated with some elements can be stronger than others to indicate importance or just to differentiate different elements. For example, icons can be associated with stronger pulses than folders, where the folders can be associated with stronger pulses than tool bar items. Also, the strength of a pulse can be associated with the displayed size of the graphical element, where a large tool bar icon can be associated a stronger pulse than a small tool bar icon. On web pages this is particularly interesting, where small graphical targets can be associated with weaker pulses than large graphical targets. Also, on web pages check boxes and hyperlinks can feel different than buttons or graphical elements based on pulse strength. The magnitude of the pulses can also depend on other characteristics of graphical objects, such as an active window as distinguished from a background window, file folder icons of different priorities designated by the user, icons for games as distinguished from icons for business applications, different menu items in a drop-down menu, etc. Methods of adding tactile sensations to web pages is described in U.S. Pat. Nos. 5,956,484 and 6,219,032, both incorporated herein by reference.

In another interaction, when a document is being scrolled, a pulse sensation can be used to indicate the passing of page breaks or other demarcations, e.g. when a particular area or feature of a scrolled page is scrolled past a particular area of the window. In a related tactile sensations, when a document is being scrolled, a vibration sensation can be used to indicate the motion. The frequency of the vibration can be used to indicate the speed of the scrolling, where fast scrolling is correlated with higher-frequency sensations than slow scrolling.

In other related scrolling interactions, when a down-arrow is pressed on a scroll bar, a vibration can be displayed on the device to indicate that scrolling is in process. When using a graphical slider and reaching the end of the slider's travel, a pulse can be used to indicate that the end of travel has been reached. When using a slider bar that has "tick marks", pulse sensations can be used to indicate the location of the "ticks." In some slider bars there is only a single tick mark to indicate the center of the slider bar; a pulse can be output to inform the user when center is reached. In other slider bars there are ticks of different size (for example the center tick may be more important than the others). In such an embodiment, different strength pulses can be used, larger strength indicating the more important ticks. For example, when setting the balance on system audio speakers, a slider is used with tick marks. The user can feel the ticks with the present invention by providing associated pulses, especially the center tick which indicates center balance. Pulses can also be provided for volume controls. In other instances, strength of a vibration can be correlated with the adjustment of a volume control to indicate magnitude. In yet other instances the frequency of a vibration can be correlated with the adjustment of a volume control to indicate magnitude.

In other interactions, when dragging a graphical object in a graphical user interface, such as an icon, or stretching an element such as a line, a vibration sensation can be used to indicate that the function is active.

In some cases a user performs a function, like cutting or pasting a document, and there is a delay between the button press that commands the function and the execution of the function, due to processing delays or other delays. A pulse sensation can be used to indicate that the function (the cut or paste) has been executed.

Tactile sensations can also be associated with particular events that the user may or may not have control over. For example, when email arrives or an appointment reminder is displayed, a pulse or a vibration can be output to notify the user of the event. This is particularly useful for disabled users (e.g., blind or deaf users). When an error message or other system event is displayed in a dialog box on the host computer, a pulse or vibration can be used to draw the user's attention to that system event. When the host system is "thinking," requiring the user to wait while a function is being performed or accessed (usually when a timer is displayed by the host) it is often a surprise when the function is complete. If the user takes his or her eyes off the screen, he or she may not be aware that the function is complete. A pulse sensation can be sent to indicate that the "thinking" is over. The tactile sensations can be varied to signify different types of events or different events of the same type. For example, vibrations of different frequency can each be used to differentiate different events or different characteristics of events, such as particular users sending email, the priority of an event, or the initiation or conclusion of particular tasks (e.g. the downloading of a document or data over a network).

Many tactile sensations can be coordinated with interactions and events occurring within specific types of applications. For example, in a gaming application, a wide variety of periodic sensations can be used to enhance various gaming actions and events, such as engine vibrations, weapon fire, crashes and bumps, rough roads, explosions, etc. These sensations can be implemented as button reflexes as described in U.S. Pat. No. 5,691,898, incorporated herein by reference.

In a spread sheet application, pulse sensations can be used to indicate when the cursor is moved from one element or cell to another. Stronger pulses can be used to indicate when a particular or predefined row, column, or cell is encountered. Ideally the user who is crafting the spreadsheet can define the strength of the sensation as part of the spreadsheet construction process as well as the particular features assigned to particular pulse strengths.

In a word processor, pulse sensations can be output to allow the user to feel the boundaries between words, the spaces between words, the spaces between lines, punctuation, highlights, bold text, or other notable elements. When adjusting the tab spacing in a word processor, pulses can be used to indicate the adjustment of the graphical tab markers. Stronger pulses can be used on the spaces at certain multiples. When writing an outline in a word processor in which a hierarchy of paragraphs is imposed, pulses can be used to indicate when the cursor is on a particular outline line of a given hierarchy.

In a drawing application that allows a user to lay down color pixels using a "spray can" metaphor, a vibration can be output during the "spraying" process to make the spray-can metaphor more compelling to the user. Drawing or CAD programs also have many other features which can be associated with pulses or other sensations, such as displayed (or invisible) grid lines or dots, control points of a drawn object, outlines or borders of objects, etc.

On web pages, pulse or vibration content can be used to enhance the user experience, e.g. for web objects such as web page links, entry text boxes, graphical buttons, and images. Methods of adding such content are described in U.S. Pat. Nos. 5,956,484 and 6,219,032, both incorporated herein by reference.

There may be certain cases where a user might want to be able to turn on or turn off the pulse feedback for a particular feature. For example, when adding a letter to a word in a word processor it is useful to be able to feel the letters as pulses as the cursor is moved from letter to letter along a word. However, this sensation is not always desired by the user. Therefore the sensation can preferably be enabled or disabled by a software selector such as a check box, and/or by hardware such as pressing a button on the device 12. In other cases or embodiments, a feature can be enabled or disabled depending upon the velocity at which the sphere 15 is being moved. For example, if the user is moving the cursor very quickly across the displayed desktop, the user is probably not trying to select a graphical object in the path of the cursor. In that case the pulses could be a distraction as the cursor passes over icons or over window borders. Therefore, it would be advantageous if the host software (or the software/firmware run by a local microprocessor) attenuated or eliminated the pulses when moving at or greater than a threshold velocity. Conversely, when the user is moving the cursor slowly he or she is likely trying to select or engage a graphical target; in that case the pulses could be active or even accentuated with a higher magnitude.

A software designer may want to allow a user to access a software function by positioning the cursor over an area on the screen, but not require pressing a button on the device (as is the typical way to execute a function, often called "clicking"). Currently, it is problematic to allow "click-less" execution because a user has physical confirmation of execution when pressing a button. A pulse sent to the tactile device of the present invention can act as that physical confirmation without the user having to press a button. For example, a user can position a cursor over a web page element, and once the cursor is within the desired region for a given period of time, an associated function can be executed. This is indicated to the user through a tactile pulse sent to the device.

If additional actuator(s) are being used to supplement the primary actuator 18, such as an actuator (e.g., a low-power brake) for providing forces on the sphere 15 as described with respect to FIG. 5, then the forces provided by the additional actuator(s) can allow additional feel sensations that supplement the "pulse" and "vibration" sensations described above. For example, when a user drags an icon with the sphere, a passive resistance force from a brake output on the sphere can provide a dragging (damping) sensation to the user. The larger the object to be dragged (in displayed size or other measurable characteristic), the more resistance is applied. Also, when a user stretches an image, the passive resistance force can provide a dragging sensation. The larger the object to be dragged, the more resistance is applied. The use of both active and passive haptic feedback can be used synergistically; for example, passive resistance can be useful to slow down sphere movement when selecting menu items, but since passive feedback can only be output when the sphere is being moved by the user, active feedback is useful to be output when the sphere is at rest or moving slowly. An embodiment employing passive braking can also employ the "desired play" methodology described in U.S. Pat. No. 5,767,839, incorporated herein by reference, to achieve enhanced functionality.

Figure 7:
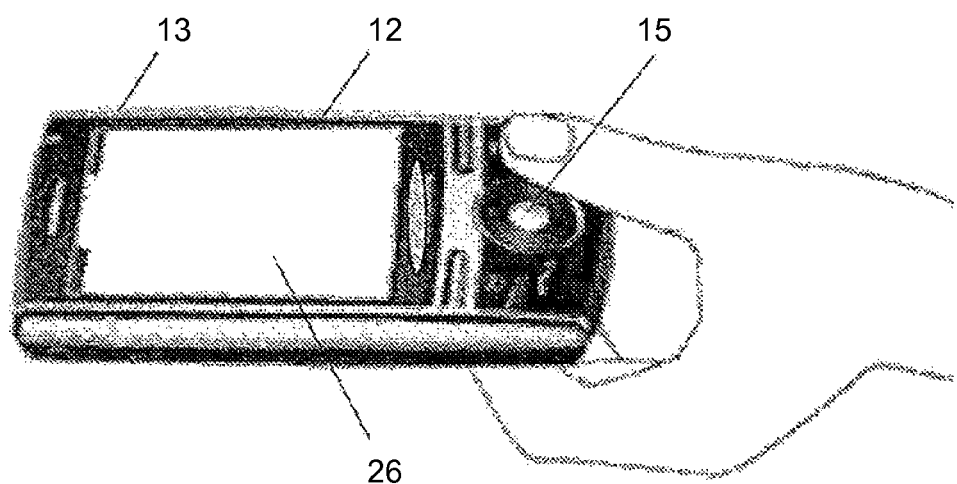
FIG. 7 is a perspective view of a haptic feedback system in accordance with an embodiment of the invention.

FIG. 7 is a diagram of an alternative embodiment of the trackball device 12 according to the present invention. As shown in FIG. 7, the trackball device 12 is a handheld device having a housing 13. The housing 13 includes a display 26, and a sphere 15 is positioned in the housing 13. The display 26 can display images from a GUI as described above with reference to FIG. 1, and the sphere 15 is used for input and can be used with the haptic feedback components, as described herein.

While this invention has been described in terms of several preferred embodiments, it is contemplated that alterations, permutations and equivalents thereof will become apparent to those skilled in the art upon a reading of the specification and study of the drawings. For example, many different types of tactile sensations can be provided with the actuator of the present invention and many different types of actuators can be used. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. An electronic device, comprising:
a housing;
a manipulandum positioned in the housing, wherein the manipulandum is moveable in at least one rotary degree of freedom in response to a user moving the manipulandum;
a sensor coupled to the manipulandum, the sensor outputs sensor signals associated with the movement of the manipulandum in the at least one rotary degree of freedom by the user's direct contact;
a processor coupled to the sensor and configured to output one or more activating signals based on the sensor signals;
a first actuator coupled to the manipulandum, wherein the first actuator outputs a contact force to the manipulandum upon receiving a first activating signal; and
a second actuator positioned within the housing and separate from the first actuator, wherein the second actuator outputs an inertial force to the housing upon receiving a second activating signal.

2. The device of claim 1, wherein the manipulandum is a sphere.

3. The device of claim 1, wherein the manipulandum is a joystick.

4. The device of claim 1, wherein the contact force is a pulse.

5. The device of claim 1, wherein the contact force is a vibration.

6. The device of claim 1, wherein the inertial force is a pulse.

7. The device of claim 1, wherein the inertial force is a vibration.

8. An electronic device comprising:
a housing having a display;
a sphere positioned in the housing and moveable by a user in at least one rotary degree of freedom by direct contact;
a processor configured to run a software program configured to present the user a graphical user interface on the display in which the graphical user interface is navigatable by the user;
a sensor coupled to the sphere, the sensor outputting, to the processor, sensor signals associated with the movement of the sphere;
a first actuator coupled to the sphere, wherein the first actuator outputs a contact force to the sphere in a direction normal to a surface of the sphere upon receiving a first activating signal from the processor, the processor outputting the first activating signal upon the user navigating within a predetermined area of the graphical user interface; and
a second actuator positioned within the housing and separate from the first actuator, wherein the second actuator outputs an inertial force to the housing upon receiving a second activating signal from the processor.

9. The device of claim 8, wherein the contact force is a pulse.

10. The device of claim 8, wherein the contact force is a vibration.

11. The device of claim 8, wherein the inertial force is a pulse.

12. The device of claim 8, wherein the inertial force is a vibration.

13. An electronic device, comprising:
a housing having a button;

a sphere positioned in the housing, wherein the sphere is moveable in at least one rotary degree of freedom in response to a user moving the sphere by direct contact;

a first sensor coupled to the sphere, the first sensor outputs first sensor signals associated with the movement of the sphere in the at least one rotary degree of freedom;

a second sensor coupled to the button, the second sensor output second sensor signals associated with the user depressing the button;

a processor coupled to the sensor and configured to output one or more activating signals based on the either or both of the first and second sensor signals;

a first actuator coupled to the sphere, wherein the first actuator outputs a first contact force to the sphere upon receiving a first activating signal from the processor;

a second actuator positioned within the housing and separate from the first actuator, wherein the second actuator outputs a second contact force to the button upon receiving a second activating signal from the processor; and a third actuator within the housing and separate from the first actuator and the second actuator, wherein the third actuator outputs an inertial force to the housing upon receiving a third activating signal from the processor.

14. The device of claim 13, wherein the first contact force is a pulse.

15. The device of claim 13, wherein the first contact force is a vibration.

16. The device of claim 13, wherein the second contact force is a pulse.

17. The device of claim 13, wherein the second contact force is a vibration.

* * * * *